US012810838B2

(12) United States Patent
Koppens

(10) Patent No.: US 12,810,838 B2
(45) Date of Patent: Nov. 24, 2026

(54) AUDIO APPARATUS AND METHOD OF OPERATION THEREFOR

(71) Applicant: KONINKLIJKE PHILIPS N.V., Eindhoven (NL)

(72) Inventor: Jeroen Gerardus Henricus Koppens, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 230 days.

(21) Appl. No.: 18/703,381

(22) PCT Filed: Oct. 19, 2022

(86) PCT No.: PCT/EP2022/078998

§ 371 (c)(1),
(2) Date: Apr. 22, 2024

(87) PCT Pub. No.: WO2023/072684

PCT Pub. Date: May 4, 2023

(65) Prior Publication Data

US 2024/0420676 A1 Dec. 19, 2024

(30) Foreign Application Priority Data

Oct. 26, 2021 (EP) .................................... 21204641

(51) Int. Cl.
*G10K 15/12* (2006.01)

(52) U.S. Cl.
CPC .................................... *G10K 15/12* (2013.01)

(58) Field of Classification Search
CPC .............................. H04M 3/568; H04M 3/002
(Continued)

(56) References Cited

U.S. PATENT DOCUMENTS 10,880,668 B1 12/2020 Robinson et al.
2002/0106090 A1 8/2002 Dahl et al.
(Continued)

OTHER PUBLICATIONS

International Search Report and Written Opinion from PCT/EP2022/078998 mailed Jan. 26, 2023.
(Continued)

*Primary Examiner* — Alexander Krzystan

(57) ABSTRACT

An audio apparatus comprising a receiver (501) receiving audio data and metadata including data for reverberation parameters for the environment. A modifier (503) generates a modified first parameter value for a first reverberation parameter which is a reverberation delay parameter or a reverberation decay rate parameter. A compensator (505) generates a modified second parameter value for a second reverberation parameter in response to the modification of the first reverberation parameter/The second reverberation parameter is indicative of an energy of reverberation in the acoustic environment. A renderer (400) generates audio output signals by rendering the audio data using the metadata and specifically a reverberation renderer (407) generates at least one reverberation signal component for at least one audio output signal from at least one of the audio signals and in response to the first modified parameter value and the second modified parameter value. The compensation may provide improved perceived reverberation while allowing flexible adaptation.

27 Claims, 9 Drawing Sheets

(58) Field of Classification Search
USPC .................................................... 381/63, 66
See application file for complete search history.

(56) References Cited

U.S. PATENT DOCUMENTS

| | | | | |
|---|---|---|---|---|
| 2017/0126194 | A1* | 5/2017 | Jot | H03G 5/005 |
| 2017/0287502 | A1* | 10/2017 | Buck | G10L 25/21 |
| 2019/0385587 | A1 | 12/2019 | Audfray et al. | |
| 2023/0209302 | A1 | 6/2023 | Koppens et al. | |
| 2023/0306953 | A1* | 9/2023 | Oomen | H04S 7/302 |
| 2024/0420676 | A1* | 12/2024 | Koppens | G10K 15/12 |

OTHER PUBLICATIONS

Jean-Marc Jot and Antoine Chaigne, "Digital delay networks for designing artificial reverberators", 90th AES Convention, 1991.
Jean-Marc Jot, "An analysis/synthesis approach to real-time artificial reverberation", Proc. ICASSP-92, 1992, vol. 2, pp. 221-224.
Fritz Menzer and Christof Faller, "Binaural reverberation using a modified Jot reverberator with frequency dependent interaural coherence matching", 126th AES Convention Munich, May 2009.
Https://reuk.github.io/wayverb/image_source.html downloaded Feb. 9, 2024.
Stephen G. McGovern, Fast image method for impulse response calculations of box-shaped rooms, Applied Acoustics 70 (2009) 182-189.
MPEG output document N19211, "MPEG-I 6DoF Audio Encoder Input Format", MPEG 130.
Https://en.wikipedia.org/wiki/Critical_distance.

* cited by examiner

AUDIO APPARATUS AND METHOD OF OPERATION THEREFOR

CROSS-REFERENCE TO PRIOR APPLICATIONS

This application is the U.S. National Phase application under 35 U.S.C. § 371 of International Application No. PCT/EP2022/078998, filed on Oct. 19, 2022, which claims the benefit of EP Patent Application No. EP 21204641.1, filed on Oct. 26, 2021. These applications are hereby incorporated by reference herein.

FIELD OF THE INVENTION

The invention relates to an apparatus and method for generating audio output signals, and in particular, but not exclusively, for generating audio output signals including diffuse reverberation signal components emulating reverberation characteristics of an environment as part of e.g. a Virtual Reality experience.

BACKGROUND OF THE INVENTION

The variety and range of experiences based on audiovisual content have increased substantially in recent years with new services and ways of utilizing and consuming such content continuously being developed and introduced. In particular, many spatial and interactive services, applications and experiences are being developed to give users a more involved and immersive experience.

Examples of such applications are Virtual Reality (VR), Augmented Reality (AR), and Mixed Reality (MR) applications, which are rapidly becoming mainstream, with a number of solutions being aimed at the consumer market. A number of standards are also under development by a number of standardization bodies. Such standardization activities are actively developing standards for the various aspects of VR/AR/MR systems including e.g. streaming, broadcasting, rendering, etc.

VR applications tend to provide user experiences corresponding to the user being in a different world/environment/scene whereas AR (including Mixed Reality MR) applications tend to provide user experiences corresponding to the user being in the current environment but with additional information or virtual objects or information being added. Thus, VR applications tend to provide a fully immersive synthetically generated world/scene whereas AR applications tend to provide a partially synthetic world/scene which is overlaid the real scene in which the user is physically present. However, the terms are often used interchangeably and have a high degree of overlap. In the following, the term Virtual Reality/VR will be used to denote both Virtual Reality and Augmented/Mixed Reality.

As an example, a service being increasingly popular is the provision of images and audio in such a way that a user is able to actively and dynamically interact with the system to change parameters of the rendering such that this will adapt to movement and changes in the user's position and orientation. A very appealing feature in many applications is the ability to change the effective viewing position and viewing direction of the viewer, such as for example allowing the viewer to move and "look around" in the scene being presented.

Such a feature can specifically allow a virtual reality experience to be provided to a user. This may allow the user to (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications, such as in the category of first person shooters, for computers and consoles.

It is also desirable, in particular for virtual reality applications, that the image being presented is a three-dimensional image, typically presented using a stereoscopic display. Indeed, in order to optimize immersion of the viewer, it is typically preferred for the user to experience the presented scene as a three-dimensional scene. Indeed, a virtual reality experience should preferably allow a user to select his/her own position, viewpoint, and moment in time relative to a virtual world.

In addition to the visual rendering, most VR/AR applications further provide a corresponding audio experience. In many applications, the audio preferably provides a spatial audio experience where audio sources are perceived to arrive from positions that correspond to the positions of the corresponding objects in the visual scene. Thus, the audio and video scenes are preferably perceived to be consistent and with both providing a full spatial experience.

For example, many immersive experiences are provided by a virtual audio scene being generated by headphone reproduction using binaural audio rendering technology. In many scenarios, such headphone reproduction may be based on headtracking such that the rendering can be made responsive to the user's head movements, which highly increases the sense of immersion.

An important feature for many applications is that of how to generate and/or distribute audio that can provide a natural and realistic perception of the audio environment. For example, when generating audio for a virtual reality application it is important that not only are the desired audio sources generated but these are also modified to provide a realistic perception of the audio environment including damping, reflection, coloration etc.

For room acoustics, or more generally environment acoustics, reflections of sound waves off walls, floor, ceiling, objects etc. of an environment cause delayed and attenuated (typically frequency dependent) versions of the sound source signal to reach the listener (i.e. the user for a VR/AR system) via different paths. The combined effect can be modelled by an impulse response which may be referred to as a Room Impulse Response (RIR) hereafter (although the term suggests a specific use for an acoustic environment in the form of a room it tends to be used more generally with respect to an acoustic environment whether this corresponds to a room or not).

As illustrated in FIG. 1, a room impulse response typically consists of a direct sound that depends on distance of the sound source to the listener, followed by a reverberant portion that characterizes the acoustic properties of the room. The size and shape of the room, the position of the sound source and listener in the room and the reflective properties of the room's surfaces all play a role in the characteristics of this reverberant portion.

The reverberant portion can be broken down into two temporal regions, usually overlapping. The first region contains so-called early reflections, which represent isolated reflections of the sound source on walls or obstacles inside the room prior to reaching the listener. As the time lag/(propagation) delay increases, the number of reflections present in a fixed time interval increases and the paths may include secondary or higher order reflections (e.g. reflections may be off several walls or both walls and ceiling etc).

The second region in the reverberant portion is the part where the density of these reflections increases to a point that they cannot be isolated by the human brain anymore. This region is typically called the diffuse reverberation, late reverberation, or reverberation tail.

The reverberant portion contains cues that give the auditory system information about the distance of the source, and size and acoustical properties of the room. The energy of the reverberant portion in relation to that of the anechoic portion largely determines the perceived distance of the sound source. The level and delay of the earliest reflections may provide cues about how close the sound source is to a wall, and the filtering by anthropometrics may strengthen the assessment of the specific wall, floor or ceiling.

The density of the (early-) reflections contributes to the perceived size of the room. The time that it takes for the reflections to drop 60 dB in energy level, indicated by the reverberation time $T_{60}$, is a frequently used measure for how fast reflections dissipate in the room. The reverberation time provides information on the acoustical properties of the room; such as specifically whether the walls are very reflective (e.g. bathroom) or there is much absorption of sound (e.g. bedroom with furniture, carpet and curtains).

Furthermore, RIRs may be dependent on a user's anthropometric properties when it is a part of a binaural room impulse response (BRIR), due to the RIR being filtered by the head, ears and shoulders; i.e. the head related impulse responses (HRIRs).

As the reflections in the late reverberation cannot be differentiated and isolated by a listener, they are often simulated and represented parametrically with, e.g., a parametric reverberator using a feedback delay network, as in the well-known Jot reverberator.

For early reflections, the direction of incidence and distance dependent delays are important cues to humans to extract information about the room and the relative position of the sound source. Therefore, the simulation of early reflections must be more explicit than the late reverberation. In efficient acoustic rendering algorithms, the early reflections are therefore simulated differently from the later reverberation. A well-known method for early reflections is to mirror the sound sources in each of the room's boundaries to generate a virtual sound source that represents the reflection.

For early reflections, the position of the user and/or sound source with respect to the boundaries (walls, ceiling, floor) of a room is relevant, while for the late reverberation, the acoustic response of the room is diffuse and therefore tends to be more homogeneous throughout the room. This allows simulation of late reverberation to often be more computationally efficient than early reflections.

Two main properties of the late reverberation that are defined by the room are parameters that represent the slope and amplitude of the impulse response for times above a given level. Both parameters tend to be strongly frequency dependent in natural rooms.

Examples of parameters that are traditionally used to indicate the slope and amplitude of the impulse response corresponding to diffuse reverberation include the known $T_{60}$ value and the reverb level/energy. More recently other indications of the amplitude level has been suggested, such as specifically parameters indicating the ratio between diffuse reverberation energy and the total emitted source energy.

Such known approaches tend to provide efficient descriptions of reverberation which allows for accurately reproduction of reverberation characteristics of the environment at the rendering side. However, whereas the approaches tend to be advantageous when seeking to accurately render the reverberation in the environment, they tend to be suboptimal and in particular tend to be relatively inflexible, in some scenarios. Typically, it tends to be difficult to adapt and modify the processing and/or the resulting reverberation components, and especially without degrading (perceived) audio quality and/or requiring more than preferred computational resource.

Hence, an improved approach for rendering reverberation audio for an environment would be advantageous. In particular, an approach that allows improved operation, increased flexibility, reduced complexity, facilitated implementation, an improved audio experience, improved audio quality, reduced computational burden, improved suitability for varying positions, improved performance for virtual/mixed/augmented reality applications, improved perceptual cues for diffuse reverberation, increased and/or facilitated adaptability, increased processing flexibility, increased render side customization and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an audio apparatus comprising: a receiver arranged to receive audio data and metadata for the audio data, the audio data comprising data for a plurality of audio signals representing audio sources in an environment and the metadata including data for reverberation parameters for the environment; a modifier arranged to generate a modified first parameter value by modifying an initial first parameter value of a first reverberation parameter, the first reverberation parameter being a parameter from the group consisting of a reverberation delay parameter and a reverberation decay rate parameter; a compensator arranged to generate a modified second parameter value by modifying an initial second parameter value for a second reverberation parameter in response to the modification of the first reverberation parameter, the second reverberation parameter being included in the metadata and being indicative of an energy of reverberation in the acoustic environment; a renderer arranged to generate audio output signals by rendering the audio data using the metadata, the renderer comprising a reverberation renderer arranged to generate at least one reverberation signal component for at least one audio output signal from at least one of the audio signals and in response to the first modified parameter value and the second modified parameter value.

The invention may provide improved and/or facilitated rendering of audio including reverberation components. The invention may in many embodiments and scenarios generate a more naturally sounding (diffuse) reverberation signal providing an improved perception of the acoustic environment. The rendering of the audio output signals and the reverberation signal component may often be generated with reduced complexity and reduced computational resource requirements.

The approach may provide improved, increased, and/or facilitated flexibility and/or adaptation of the processing and/or the rendered audio. Such adaptation may in many applications and embodiments be substantially facilitated by the adaptation being performed by modifying parameter values. In particular, in many cases algorithms, processes, and/or rendering operations may not be changed but rather a required adaptation may be achieved simply by modifying parameter values. Adaptation or modification of reverberation outputs and/or processing may further be facilitated by the modification of the second reverberation parameter (which is indicative of an energy of reverberation in the acoustic environment) based on how a reverberation delay parameter and/or a reverberation decay rate parameter is changed.

Modifying a reverberation delay parameter and/or a reverberation decay rate parameter may provide particularly efficient and advantageous operation and adaptation of the reverberation, and the second reverberation parameter may be automatically compensated for this modification. This may automatically reduce or remove unintended effects of the modification of the reverberation delay parameter and/or the reverberation decay rate parameter. For example, it may reduce the perceptual impact of the adaptation and/or may e.g. provide a more consistent and/or harmonious audio signal output.

The approach allows for the diffuse reverberation sound in an acoustic environment to be represented effectively by relatively few parameters.

The approach may in many embodiments allow a diffuse reverberation signal to be generated independently of source and/or listener positions. This may allow efficient generation of diffuse reverberation signals for dynamic applications where positions change, such as for many virtual reality and augmented reality applications.

The audio apparatus may be implemented in a single device or a single functional unit or may be distributed across different devices or functionalities. For example, the audio apparatus may be implemented as part of a decoder functional unit or may be distributed with some functional elements being performed at a decoder side and other elements being performed at the encoder side.

The compensator may be arranged to generate the modified second parameter value in response to a difference between the modified first parameter value and the initial first parameter value.

In many embodiments, the renderer comprises a further renderer for rendering a direct path components and/or early reflection components for the audio signals and the renderer may be arranged to generate the output signals in response to a combination of the direct path components, the early reflection components and the at least one reverberation signal.

The reverberation renderer may be a diffuse reverberation renderer. The reverberation renderer may be a parametric reverberation renderer, such as a Feedback Delay Network (FDN) reverberator, and specifically a Jot Reverberator.

The metadata may be for the audio signals/audio sources and/or environment.

According to an optional feature of the invention, the compensator comprises a model for diffuse reverberation, the model being dependent on the first reverberation parameter and the second reverberation parameter, and the compensator is arranged to determine the modified second parameter value in response to the model.

The approach may provide a particularly efficient operation for generating diffuse reverberation signals reflecting frequency dependencies.

The model may be a mathematical function/equation/or a set of functions/equations.

In accordance with an optional feature of the invention, the first reverberation parameter is a reverberation decay rate.

The invention may provide improved performance and/or operation, it may facilitate and/or improve adaptation and flexibility and may allow increased control over the rendered reverberation. A reverberation decay rate parameter may provide particularly efficient adaptation, and may in particular allow a practical adaptation of perceived properties of reverberation in the environment.

The reverberation decay rate parameter may for example be a $T_{60}$ (or more generally $T_{xx}$ where xx may be any suitable integer) parameter.

In accordance with an optional feature of the invention, the compensator is arranged to modify the second parameter value to reduce a change in an amplitude reference for the reverberation decay rate resulting from the modification of the first reverberation parameter.

This may allow particularly advantageous adaptation and may allow very efficient yet typically low complexity compensation.

The amplitude reference may be a function of the reverberation decay rate and the second parameter.

In accordance with an optional feature of the invention, the compensator is arranged to modify the second parameter value such that the amplitude reference for the reverberation decay rate is substantially unchanged for the modification of the first reverberation parameter.

This may allow particularly advantageous operation and/or performance.

In accordance with an optional feature of the invention, the first reverberation parameter is a reverberation delay parameter indicative of a propagation time delay for reverberation in the environment.

The invention may provide improved performance and/or operation. It may facilitate and/or improve adaptation and flexibility and may allow increased control over the rendered reverberation. A reverberation delay parameter may provide particularly efficient adaptation, and may in particular allow a practical adaptation of perceived properties of reverberation in the environment.

The reverberation delay parameter may specifically be a pre-delay parameter.

The propagation time delay may indicate a time offset from a reference event in wave propagation in a room. Typically, the reference event is the emission of sound energy at the audio source but may in some cases/embodiments be the direct path response. More specifically it may indicate a lag in a room impulse response. In many embodiments it may indicate an offset time for which the second reverberation parameter being indicative of an energy of reverberation in the acoustic environment is calculated. The value may be chosen by analyzing a room impulse response to be represented by the reverberation parameters. For example, the propagation time delay may indicate the delay between the emission at the source and the onset of the diffuse late reverberation part of a signal (i.e. the sound after the early reflections) and may specified in seconds, or the lag in the room response from which it is diffuse, i.e. the same incident level from all directions and a similar level over all positions in the room.

In accordance with an optional feature of the invention, the second reverberation parameter is indicative of an energy of reverberation in the acoustic environment after a propagation time delay indicated by the first reverberation parameter.

This may allow particularly advantageous operation and/or performance.

In accordance with an optional feature of the invention, the compensator is arranged to determine the modified second parameter value to reduce a difference between a first reverberation energy measure and a second reverberation energy measure, the first reverberation energy measure being an energy of reverberation after a modified delay represented by the modified first parameter value and determined from a reverberation model using the modified delay value and the modified second parameter value; and the second reverberation energy measure being an energy of reverberation after the modified delay and determined from the reverberation model using the initial delay value and the initial second parameter value.

This may allow particularly advantageous operation and/or performance. In many scenarios, it may allow a reduced perceptual effect of the modification of the reverberation delay parameter on the rendered reverberation.

In accordance with an optional feature of the invention, the compensator is arranged to determine the modified second reverberation parameter value such that the first reverberation energy measure and the second reverberation energy measure are substantially the same.

This may allow particularly advantageous operation and/or performance. In many scenarios, it may allow a reduced, or even substantially no, perceptual effect of the modification of the reverberation delay parameter on the rendered reverberation.

In accordance with an optional feature of the invention, the compensator is arranged to modify the second parameter value to reduce a difference in a reverberation amplitude as a function of time for a delay exceeding a delay indicated by the modified first parameter value.

This may allow particularly advantageous operation and/or performance. In many scenarios, it may allow a reduced perceptual effect of the modification of the reverberation delay parameter on the rendered reverberation.

In many embodiments, the reverberation renderer is arranged to generate the at least one reverberation signal component to include only contributions corresponding to propagation delays exceeding a propagation delay time indicated by the first modified reverberation parameter.

In some embodiments, the reverberation renderer is arranged to generate the at least one reverberation signal component to include only contributions corresponding to a part of a room impulse response at times exceeding a propagation delay time indicated by the first modified reverberation parameter.

In accordance with an optional feature of the invention, the second parameter represents a level of diffuse reverberation sound relative to total emitted sound in the environment.

This may provide a particularly advantageous operation and/or performance.

In many embodiments, the second parameter represents an energy of diffuse reverberation sound relative to total emitted energy in the environment.

The diffuse reverberation signal to total signal relationship/ratio may also be referred to as the diffuse reverberation signal level to total signal level ratio or the diffuse reverberation level to total level ratio or emitted source energy to the diffuse reverberation energy ratio (or variations/permutations thereof).

In accordance with an optional feature of the invention, the second reverberation parameter represents a distance for which an energy of a direct response for sound propagation in the environment is equal to an energy of reverberation in the environment.

This may provide a particularly advantageous operation and/or performance.

The second reverberation parameter may be a critical distance parameter.

In some embodiments, the second parameter represents an amplitude at a given determined time/lag for a room impulse response for the environment.

In accordance with an optional feature of the invention, the first reverberation parameter is one of the reverberation parameters of the metadata.

In accordance with an optional feature of the invention, the renderer is arranged to determine a level gain for the at least one reverberation signal component in dependence on the second parameter value.

This may provide an efficient and advantageous generation of a reverberation signal component in many scenarios. The level gain may for example be a gain/scale factor which determines/sets/controls the level of the reverberation signal component.

This may provide a particularly advantageous operation and/or performance.

According to an aspect of the invention there is provided a method of operation for an audio apparatus comprising: receiving audio data and metadata for the audio data, the audio data comprising data for a plurality of audio signals representing audio sources in an environment and the metadata including data for reverberation parameters for the environment; modifying a first parameter value by modifying an initial first parameter value of a first reverberation parameter, the first reverberation parameter being a parameter from the group consisting of a reverberation delay parameter and a reverberation decay rate parameter; generating a modified second parameter value by modifying an initial second parameter value for a second reverberation parameter in response to the modification of the first reverberation parameter, the second reverberation parameter being included in the metadata and being indicative of an energy of reverberation in the acoustic environment; generating audio output signals by rendering the audio data using the metadata, the rendering comprising generating at least one reverberation signal component for at least one audio output signal from at least one of the audio signals and in response to the first modified parameter value and the second modified parameter value. These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
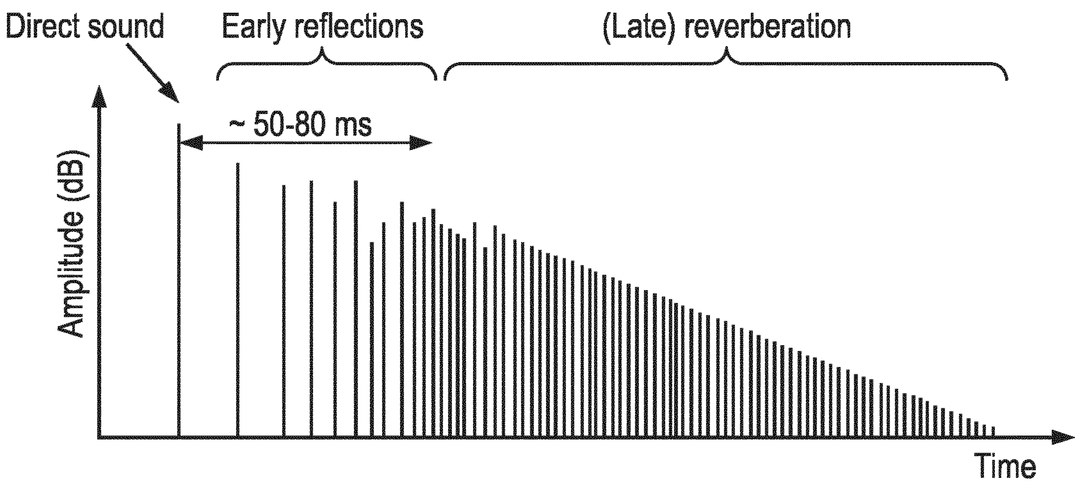
FIG. 1 illustrates an example of a room impulse response.
Figure 2:
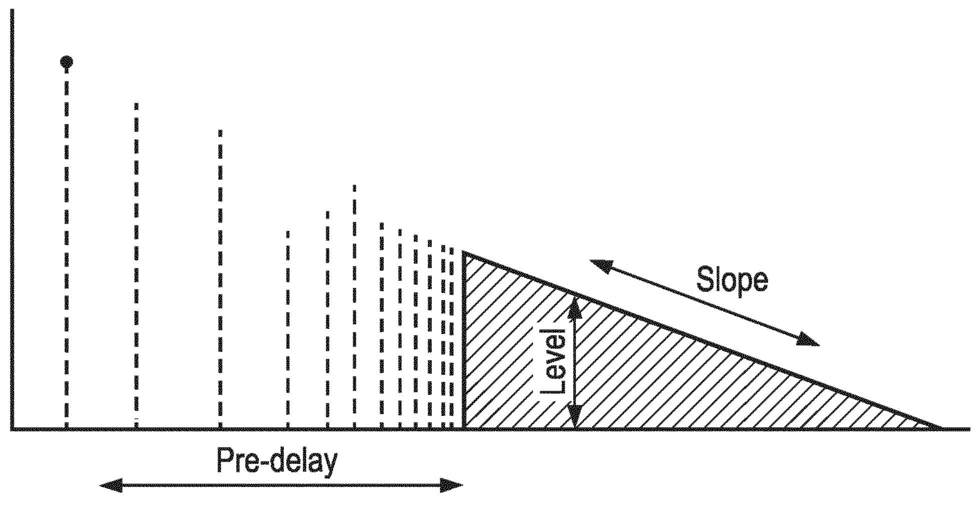
FIG. 2 illustrates an example of a room impulse response.

The following description will focus on audio processing and rendering for a virtual reality application, but it will be appreciated that the described principles and concepts may be used in many other applications and embodiments.

Virtual experiences allowing a user to move around in a virtual world are becoming increasingly popular and services are being developed to satisfy such a demand.

In some systems, the VR application may be provided locally to a viewer by e.g. a stand-alone device that does not use, or even have any access to, any remote VR data or processing. For example, a device such as a games console may comprise a store for storing the scene data, input for receiving/generating the viewer pose, and a processor for generating the corresponding images from the scene data.

In other systems, the VR application may be implemented and performed remote from the viewer. For example, a device local to the user may detect/receive movement/pose data which is transmitted to a remote device that processes the data to generate the viewer pose. The remote device may then generate suitable view images and corresponding audio signals for the user pose based on scene data describing the scene. The view images and corresponding audio signals are then transmitted to the device local to the viewer where they are presented. For example, the remote device may directly generate a video stream (typically a stereo/3D video stream) and corresponding audio stream which is directly presented by the local device. Thus, in such an example, the local device may not perform any VR processing except for transmitting movement data and presenting received video data.

In many systems, the functionality may be distributed across a local device and remote device. For example, the local device may process received input and sensor data to generate user poses that are continuously transmitted to the remote VR device. The remote VR device may then generate the corresponding view images and corresponding audio signals and transmit these to the local device for presentation. In other systems, the remote VR device may not directly generate the view images and corresponding audio signals but may select relevant scene data and transmit this to the local device, which may then generate the view images and corresponding audio signals that are presented. For example, the remote VR device may identify the closest capture point and extract the corresponding scene data (e.g. a set of object sources and their position metadata) and transmit this to the local device. The local device may then process the received scene data to generate the images and audio signals for the specific, current user pose. The user pose will typically correspond to the head pose, and references to the user pose may typically equivalently be considered to correspond to the references to the head pose.

In many applications, especially for broadcast services, a source may transmit or stream scene data in the form of an image (including video) and audio representation of the scene which is independent of the user pose. For example, signals and metadata corresponding to audio sources within the confines of a certain virtual room may be transmitted or streamed to a plurality of clients. The individual clients may then locally synthesize audio signals corresponding to the current user pose. Similarly, the source may transmit a general description of the audio environment including describing audio sources in the environment and acoustic characteristics of the environment. An audio representation may then be generated locally and presented to the user, for example using binaural rendering and processing.

Figure 3:
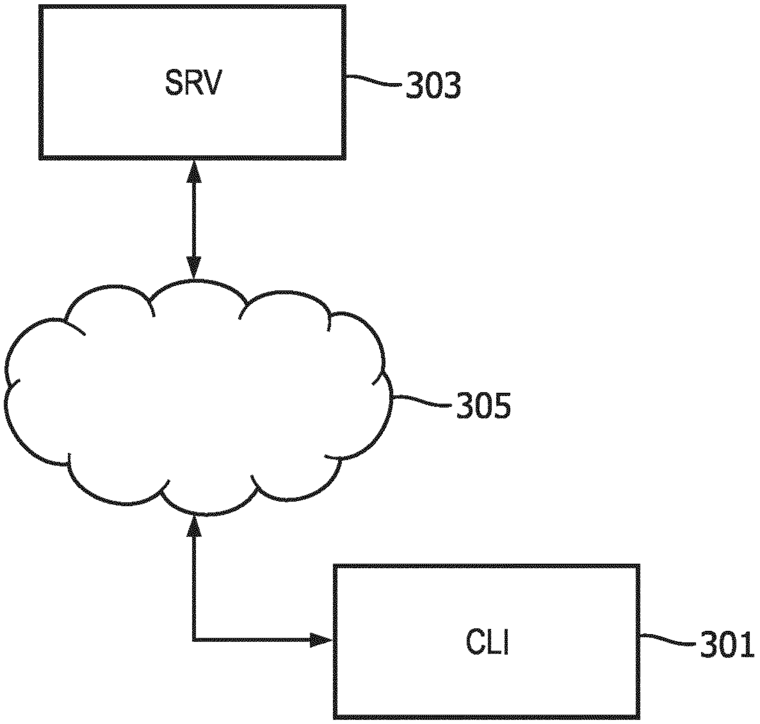
FIG. 3 illustrates an example of elements of virtual reality system.

FIG. 3 illustrates such an example of a VR system in which a remote VR client device 301 liaises with a VR server 303 e.g. via a network 305, such as the Internet. The server 303 may be arranged to simultaneously support a potentially large number of client devices 301.

The VR server 303 may for example support a broadcast experience by transmitting an image signal comprising an image representation in the form of image data that can be used by the client devices to locally synthesize view images corresponding to the appropriate user poses (a pose refers to a position and/or orientation). Similarly, the VR server 303 may transmit an audio representation of the scene allowing the audio to be locally synthesized for the user poses. Specifically, as the user moves around in the virtual environment, the image and audio synthesized and presented to the user is updated to reflect the current (virtual) position and orientation of the user in the (virtual) environment.

In many applications, such as that of FIG. 3, it may thus be desirable to model a scene and generate an efficient image and audio representation that can be efficiently included in a data signal that can then be transmitted or streamed to various devices which can locally synthesize views and audio for different poses than the capture poses.

In some embodiments, a model representing a scene may for example be stored locally and may be used locally to synthesize appropriate images and audio. For example, an audio model of a room may include an indication of properties of audio sources that can be heard in the room as well as acoustic properties of the room. The model data may then be used to synthesize the appropriate audio for a specific position.

It is a critical question how the audio scene is represented and how this representation is used to generate audio. Audio rendering aimed at providing natural and realistic effects to a listener typically includes rendering of an acoustic environment. For many environments, this includes the representation and rendering of diffuse reverberation present in the environment, such as in a room. The rendering and representation of such diffuse reverberation has been found to have a significant effect on the perception of the environment, such as on whether the audio is perceived to represent a natural and realistic environment. In the following, advantageous approaches will be described for representing an audio scene, and of rendering audio, and in particular diffuse reverberation audio.

Figure 4:
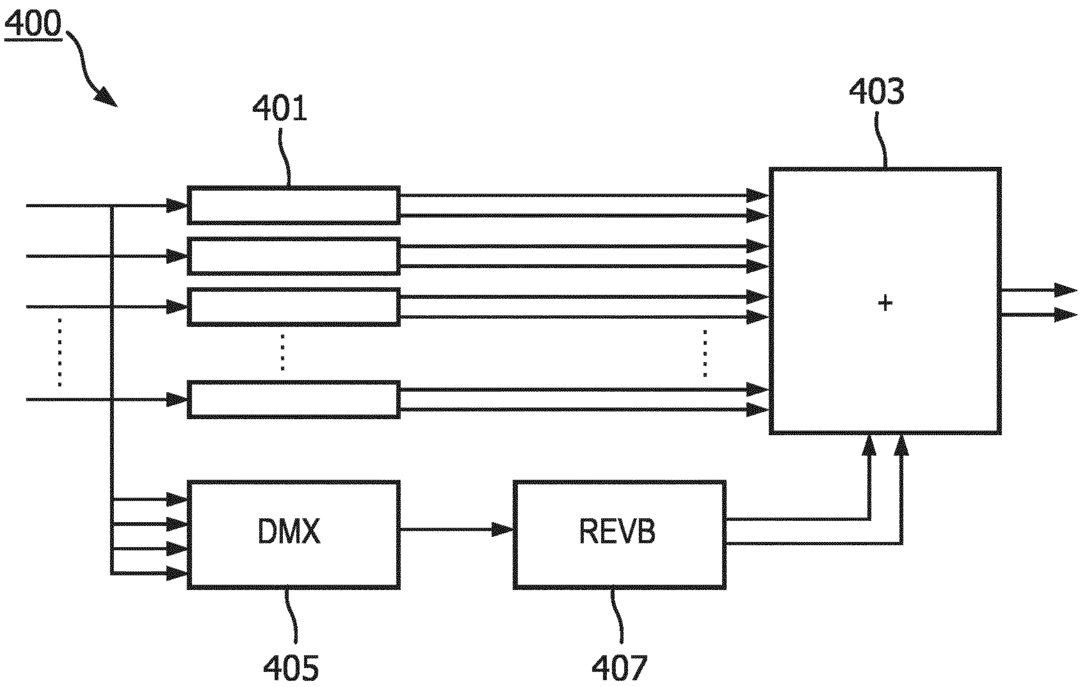
FIG. 4 illustrates an example of a renderer for generating an audio output in accordance with some embodiments of the invention.

The approach will be described with reference to an audio apparatus comprising a renderer 400 as illustrated in FIG. 4. The audio apparatus is arranged to generate an audio output signal that represents audio in an acoustic environment. Specifically, the audio apparatus may generate audio representing the audio perceived by a user moving around in a virtual environment with a number of audio sources and with given acoustic properties. Each audio source is represented by an audio signal representing the sound from the audio source as well as metadata that may describe characteristics of the audio source (such as providing a level indication for the audio signal). In addition, metadata is provided to characterize the acoustic environment.

The renderer 400 comprises a path renderer 401 for each audio source. Each path renderer 401 is arranged to generate a direct path signal component representing the direct path from the audio source to the listener. The direct path signal component is generated based on the positions of the listener and the audio source and may specifically generate the direct signal component by scaling the audio signal, potentially frequency dependently, for the audio source depending on the distance and e.g. relative gain for the audio source in the specific direction to the user (e.g. for non-omnidirectional sources).

In many embodiments, the renderer 401 may also generate the direct path signal based on occluding or diffracting (virtual) elements that are in between the source and user positions.

In many embodiments, the path renderer 401 may also generate further signal components for individual paths where these include one or more reflections. This may for example be done by evaluating reflections of walls, ceiling etc. as will be known to the skilled person. The direct path and reflected path components may be combined into a single output signal for each path renderer and thus a single signal representing the direct path and early/discrete reflections may be generated for each audio source.

In some embodiments, the output audio signal for each audio source may be a binaural signal and thus each output signal may include both a left ear and a right car (sub) signal.

The output signals from the path renderers 401 are provided to a combiner 403 which combines the signals from the different path renderers 401 to generate a single combined signal. In many embodiments, a binaural output signal may be generated and the combiner may perform a combination, such as a weighted combination, of the individual signals from the path renderers 401, i.e. all the right car signals from the path renderers 401 may be added together to generate the combined right car signals and all the left ear signals from the path renderers 401 may be added together to generate the combined left car signals.

The path renderers and combiner may be implemented in any suitable way including typically as executable code for processing on a suitable computational resource, such as a microcontroller, microprocessor, digital signal processor, or central processing unit including supporting circuitry such as memory etc. It will be appreciated that the plurality of path renderers may be implemented as parallel functional units, such as e.g. a bank of dedicated processing unit, or may be implemented as repeated operations for each audio source. Typically, the same algorithm/code is executed for each audio source/signal.

In addition to the individual path audio components, the renderer 400 is further arranged to generate a signal component representing the diffuse reverberation in the environment. The diffuse reverberation signal is in the specific example generated by combining the source signals into a downmix signal and then applying a reverberation algorithm to the downmix signal to generate the diffuse reverberation signal.

The audio apparatus of FIG. 4 comprises a downmixer 405 which receives the audio signals for a plurality of the sound sources (typically all sources inside the acoustic environment for which the reverberator is simulating the diffuse reverberation) and combines them into a downmix. The downmix accordingly reflects all the sound generated in the environment. The coefficients/weights for the individual audio signal may for example be set to reflect the level of the corresponding sound source.

The downmix is fed to a reverberation renderer/reverberator 407 which is arranged to generate a diffuse reverberation signal based on the downmix. The reverberator 407 may specifically be a parametric reverberator such as a Jot reverberator. The reverberator 407 is coupled to the combiner 403 to which the diffuse reverberation signal is fed. The combiner 403 then proceeds to combine the diffuse reverberation signal with the path signals representing the individual paths to generate a combined audio signal that represents the combined sound in the environment as perceived by the listener.

Figure 5:
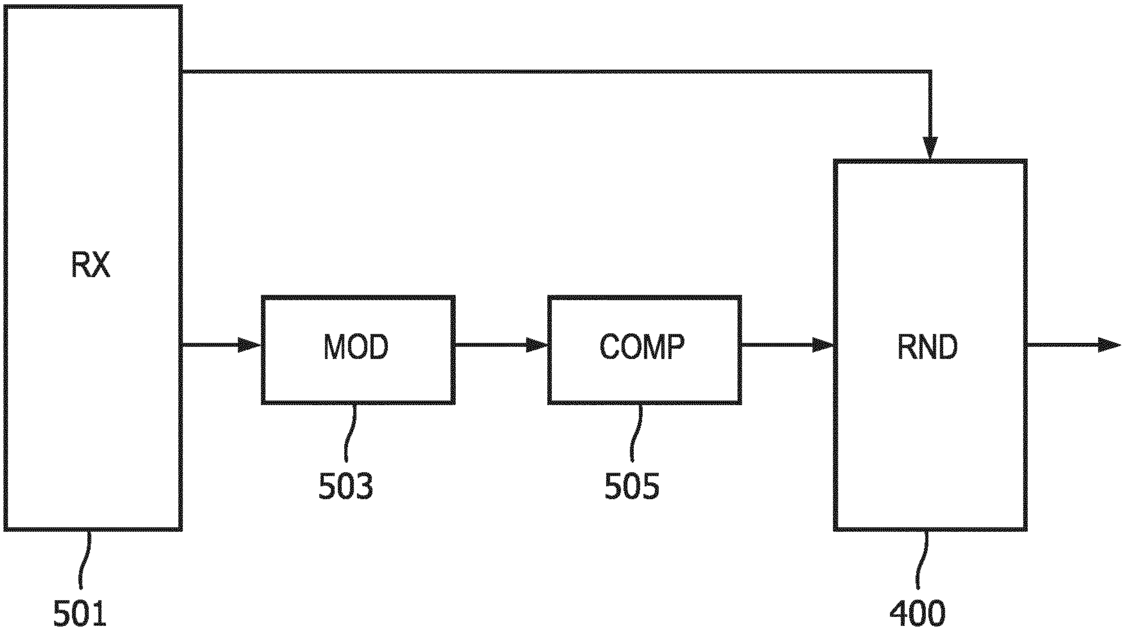
FIG. 5 illustrates an example of an audio apparatus for generating an audio output in accordance with some embodiments of the invention.

The renderer is in the example part of an audio apparatus which is arranged to receive audio data and metadata for an environment and to render audio representing at least part of the environment based on the received data. FIG. 5 illustrates an example of such an apparatus and an approach for generating audio output signals, and specifically reverberation signal components based on received audio data and metadata, will be described with reference to the example of FIGS. 4 and 5. The audio apparatus of FIG. 5 may specifically correspond to, or be part of, the client device 301 of FIG. 3.

The audio apparatus of FIG. 5 comprises a receiver 501 which is arranged to receive data from one or more sources. The source(s) may be any suitable source(s) for providing data, and may be internal or external sources. The receiver 501 may comprise the required functionality for receiving/retrieving the data, such as for example radio functionality, network interface functionality etc.

The receiver 501 may receive the data from any suitable source and in any suitable form, including e.g. as part of an audio signal. The data may be received from an internal or external source. The receiver 401 may for example be arranged to receive the room data via a network connection, radio connection, or any other suitable connection to an internal source. In many embodiments, the receiver may receive the data from a local source, such as a local memory. In many embodiments, the receiver 501 may for example be arranged to retrieve the room data from local memory, such as local RAM or ROM memory. In the specific example, the receiver 501 may include network functionality for interfacing to the network 305 in order to receive data from the VR server 303.

The receiver 501 may be implemented in any suitable way including e.g. using discrete or dedicated electronics. The receiver 501 may for example be implemented as an integrated circuit such as an Application Specific Integrated Circuit (ASIC). In some embodiments, the circuit may be implemented as a programmed processing unit, such as for example as firmware or software running on a suitable processor, such as a central processing unit, digital signal processing unit, or microcontroller etc. It will be appreciated that in such embodiments, the processing unit may include on-board or external memory, clock driving circuitry, interface circuitry, user interface circuitry etc. Such circuitry may further be implemented as part of the processing unit, as integrated circuits, and/or as discrete electronic circuitry.

The received data comprises audio data for plurality of audio signals representing audio sources in an environment. The audio data specifically includes a plurality of audio signals where each of the audio signals represent one audio source (and thus an audio signal describes the sound from an audio source).

In addition, the receiver 501 receives metadata for the audio sources and/or the environment.

The metadata for an individual audio signal/source may include a (relative) signal level indication for the audio source where the signal level indication may be indicative of a level/energy/amplitude of the sound source represented by the audio signal. The metadata for a source may also include directivity data indicative of directivity of sound radiation from the sound source. The directivity data for an audio signal may for example describe a gain pattern and may specifically describe the relative gain/energy density for the audio source in different directions from the position of the audio source. The metadata may also include other data, such as for example an indication of a nominal, starting or current (or possibly static) position of the audio source.

The receiver 501 further receives metadata indicative of the acoustic environment. Specifically, the receiver 501 receives metadata which includes reverberation parameters describing reverberation properties of the environment. In particular, the metadata may include an indication of a reverberation decay rate parameter, and potentially also of a reverberation delay parameter. The metadata may further include a reverberation energy parameter being indicative of the energy/level of the reverberation.

The diffuse reverberation properties of e.g. a Room Impulse Response, RIR, may be represented by parameters that may be communicated to a renderer via parameter data.

A parameter at least partly describing the reverberation of the environment is a reverberation delay parameter. The reverberation delay parameter may be indicative of the delay of the reverberation from an audio source. Specifically, the reverberation delay parameter may specifically be indicative of the start time (in the RIR) of the reverberation portion of the RIR.

In many embodiments, the metadata may comprise such an indication of when the diffuse reverberation signal should begin, i.e. it may indicate a time delay associated with the diffuse reverberation signal. The time delay indication may specifically be in the form of a pre-delay.

The pre-delay may represent the delay/lag in a RIR and may be defined to be the threshold between early reflections and diffuse, late reverberation. Since this threshold typically occurs as part of a smooth transition from (more or less) discrete reflections into a mix of fully interfering high order reflections, a suitable threshold may be selected using a suitable evaluation/decision process. The determination can be made automatic based on analysis of the RIR, or calculated based on room dimensions and/or material properties.

Alternatively, a fixed threshold, such as e.g. 80 ms into the RIR, can be chosen. Pre-delay can be indicated in seconds, milliseconds, or samples. In the following description, the pre-delay is assumed to be chosen to be at a point after which the reverb is actually diffuse. However, the described method may still work sufficiently if this is not the case.

Figure 6:
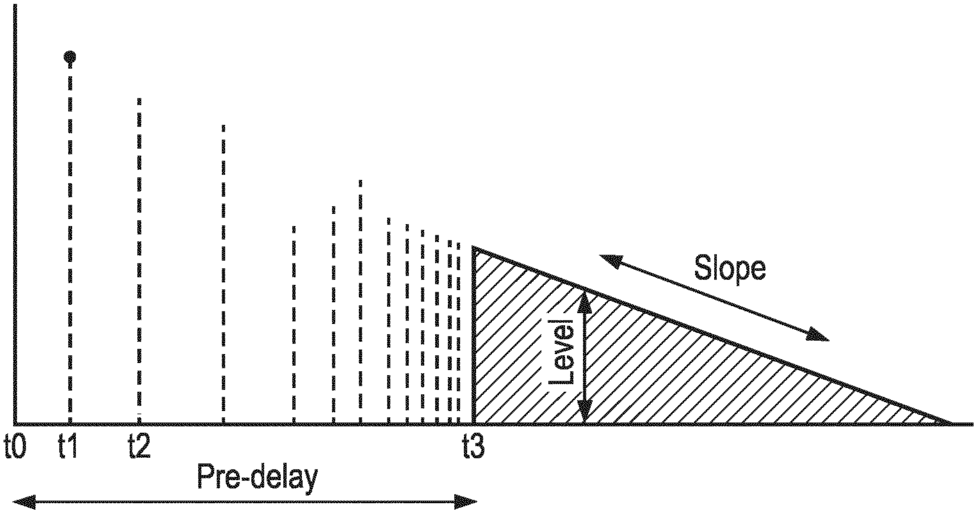
FIG. 6 illustrates an example of a room impulse response.

The pre-delay is therefore indicative of the onset of the diffuse reverb response from the onset of the source emission. E.g. for an example as shown in FIG. 6, if a source starts emitting at t0 (e.g. t0=0), the direct sound reaches the user at t1>t0, the first reflection reaches the user at t2>t1 and the defined threshold between early reflections and diffuse reverberation reaches the user at t3>t2. Then the pre-delay is t3−t0. The pre-delay can be considered to reflect the propagation delay for the start of the diffuse reverberation.

In many embodiments, a reverberation delay parameter, e.g. in the form of a pre-delay, may be included in the metadata. However, in other embodiments, it may be a predetermined or fixed parameter. For example, the bitstream may be in accordance with a suitable audio Standard or Specification which defines a standard pre-delay with reference to which other reverberation parameters may be given (e.g. a decay rate or a reverberation energy parameter).

Another parameter at least partly describing the reverberation of the environment is a reverberation decay rate parameter. The reverberation decay rate parameter may be indicative of a rate of level reduction for the reverberation of the environment, and may specifically be indicative of a rate of level reduction of the reverberation portion of the RIR. Specifically, the reverberation decay rate parameter may be indicative of a slope of the reverberation portion of the RIR.

A reverberation decay rate parameter may be indicative of the level variation for the reverberation as a function of time/lag/delay, and may specifically indicate the attenuating/reducing level of the reverberation (and specifically the reverberation part of the RIR) as a function of delay/time. In some embodiments, the reverberation decay rate parameter may be a parameter indicative of an average number of decibels (dB) reverberation response reduction per time unit (e.g. per second), or an exponent coefficient for a exponential equation describing the level decay in the linear amplitude or energy domain (e.g. $2^{-\gamma t}$).

The reverberation decay rate parameter may vary between different embodiments. In many embodiments, it may for example be a $T_{60}$, $T_{30}$, or $T_{20}$ parameter, that is known by the person skilled in the art. These parameters indicate the time it takes the reverberation energy to decay by 60 dB (resp. 30, 20 dB). For example, indicated by the time corresponding to a 60 dB drop of the energy decay curve (EDC), which is given by the integration equation:

$$EDC(t) = \int_{t}^{t_{max}} RIR(x)dx$$

with $t_{max}$ may be $t_{max}=\infty$ or the point where the room impulse response (RIR(t)) disappears into the noise floor of the RIR.

Another parameter at least partly describing the reverberation of the environment is a reverberation parameter indicative of an energy of reverberation in the acoustic environment, and which specifically may be indicative of the energy of the reverberation portion of the RIR. Such a parameter may also be referred to as a reverberation energy parameter. The reverberation energy parameter may for example be given as a reverberation energy relative to total source energy, as a critical distance, as a reverberation amplitude relative to total source energy, etc.

In many embodiments, the reverberation of the environment, and specifically the (diffuse) reverberation part of the RIR, may be characterized by the combination of a reverberation delay parameter, a reverberation decay rate parameter, and a reverberation energy parameter. Such a set of parameters may describe when reverberation starts, a time progression of the level of the reverberation, and the overall level of the reverberation. One, more, or all of these parameters may be received as part of the metadata.

Received audio data may be rendered with the reverberation part of the rendered audio being controlled by the received reverberation parameters resulting in output audio signals being generated with a reverberation component corresponding to that of the environment. However, the audio apparatus of FIG. 5 further comprises functionality that allows the reverberation to be adapted and customized locally. In the audio apparatus of FIG. 5 this is achieved by including functionality allowing the reverberation delay parameter and/or the reverberation decay rate parameter to be modified prior to being used to control the reverberation rendering by the renderer 400.

In the audio apparatus of FIG. 5, the receiver 501 is coupled to the renderer 400 and the received audio data is fed directly to the renderer 400. However, the metadata is not fed directly to the renderer 400 but rather is first fed to a modifier 503 which is arranged to modify a first reverberation parameter which is the reverberation delay parameter or the reverberation decay rate parameter (in some cases both of these parameters may be modified).

Thus, the first reverberation parameter may initially have a given parameter value and this may be modified by the modifier 503 to be a (different) modified parameter value. For example, for the reverberation delay parameter, an initial delay value may be modified to a modified delay value which may typically be either a smaller or larger delay (although in some embodiments, the modifier 503 may be asymmetric and only able to increase the delay or may only be able to decrease the delay). Alternatively, or additionally, for the reverberation decay rate parameter, an initial decay rate value may be modified to a modified decay rate value which may typically be either a smaller or larger decay rate/gradient (although in some embodiments, the modifier 503 may be asymmetric and may only be able to increase the decay rate or only able to decrease the decay rate).

The modification of a parameter value may be completely automatic and determined by the apparatus itself dependent on e.g. the current operating conditions. For example, depending on the available computational resource, the amount of the RIR that is processed by the path renderers 401 and the reverberation renderer 407 respectively may be changed dynamically by the modifier 503 changing the reverberation delay parameter. In other embodiments and applications, the modification may be in response to a user input and indeed the user may directly control the modification of the reverberation parameter. For example, if a less reverberant experience is desired by the user, a user input may allow the reverberation decay rate parameter to be modified to a parameter value corresponding to a higher decay rate, and as a consequence the reverberation may die out quicker. It will be appreciated that many other reasons, approaches, and purposes for the modification are possible, and that the described approach is not dependent on the specific background or approach for modifying the reverberation parameters.

The inventor has realized that whereas such an approach of modifying the rendering, and specifically of adapting and customizing the reverberation rendering, by modifying a second reverberation parameter describing the reverberation portion of the RIR may be highly efficient and advantageous, it is not optimal in all scenarios and may in many scenarios lead to an audio rendering that is not perceived as ideal. For example, it may in many scenarios introduce artefacts, quality degradation, perceptual distortion, and/or an imbalance between different portions of the RIR.

The inventor has further realized that a number of disadvantages can be mitigated or potentially even substantially removed by introducing a compensation which modifies a reverberation parameter that is indicative of the energy of the reverberation in the environment (a reverberation energy parameter), and specifically which is indicative of an energy/level of the reverberation portion of the RIR. The compensation is based on the modification of the reverberation delay and/or decay rate parameter, and specifically on the difference between the modified parameter value for the first reverberation parameter and the original value of the first parameter. In particular, compensating a reverberation energy parameter from the received metadata may result in improved consistency with the modified reverberation parameters, and may allow e.g. a more naturally sounding reverberation and overall audio experience to be perceived.

Accordingly, the apparatus of FIG. 5 comprises a compensator 505 which is arranged to generate a modified second reverberation parameter value by modifying the reverberation value for a second reverberation parameter in response to the modification of the first reverberation parameter where the second reverberation parameter is provided as part of the metadata and where the second reverberation parameter is a reverberation energy parameter indicative of an energy of reverberation in the acoustic environment.

The compensator 505 may for example be arranged to adapt the reverberation energy parameter to reflect that for a modified reverberation delay parameter, the energy may change if more or less of the RIR is rendered as diffuse reverberation rather than as path reflections. As another example, for a change in the reverberation decay rate parameter, the reverberation energy parameter may be changed to normalize the energy for different decay rates.

In the metadata, different parameters may in different applications and bitstreams be used to indicate the energy of the diffuse reverberation. Typically, the energy of the diffuse part of the RIR tends to be indicated by a single parameter. However, in some cases, multiple parameters may be used, either as alternatives or as a combination. The energy indication may be frequency dependent.

The specific reverberation energy parameter that is modified by the compensator may accordingly also be different in different embodiments. In the following, some particularly advantageous reverberation energy parameters will be described:

The reverberation level/energy typically has its main psycho-acoustic relevance in relation to the direct sound. The level difference between the two are an indication of the distance between the sound source and the user (or RIR measurement point). A larger distance will cause more attenuation on the direct sound, while the level of the late reverberation stays the same (it is the same in the entire room). Similarly, for sources with directivity dependent on where the user is with respect to the source, the directivity influences the direct response as the user moves around the source, but not the level of the reverberation.

Accordingly, the reverberation level may often advantageously not be indicated with respect to the direct sound, but rather a more generic property which is independent of the source and user positions inside the room may be used.

In some embodiments, the reverberation energy parameter may be a parameter indicative of the level of diffuse reverberation sound relative to total emitted sound in the environment. The reverberation energy parameter may be indicative of the diffuse reverberation signal to total signal ratio, i.e. a Diffuse to Source Ratio, DSR, may be used to express the amount of diffuse reverberation energy or level of a source received by a user as a ratio of total emitted energy of that source. It may be expressed in a way that the diffuse reverberation energy is appropriately conditioned for the level calibration of the signals to be rendered and corresponding metadata (e.g. pre-gain).

Expressing it in this way may ensure that the value is independent of the absolute positions and orientations of the listener and source in the environment, independent of the relative position and orientation of the user with respect to the source and vice versa, independent of specific algorithms for rendering reverberation, and that there is a meaningful link to the signal levels used in the system.

As will be described later, for such a reverberation energy parameter, the described exemplary rendering may calculates downmix coefficients that take into account both directivity patterns to impose the correct relative levels between the source signals, and the DSR to achieve the correct level on the output of reverberator 407.

The DSR may represent the ratio between emitted source energy and a diffuse reverberation property, such as specifically the energy or the (initial) level of the diffuse reverberation signal.

The description will mainly focus on an DSR indicative of the diffuse reverberation energy relative to the total energy:

$$DSR = \frac{\text{diffuse reverb energy}}{\text{total emitted energy}}$$

Henceforth this will be referred to as DSR (Diffuse-to-Source Ratio).

It will be appreciated that a ratio and an inverse ratio may provide the same information, i.e. that any ratio can be expressed as the inverse ratio. Thus, the diffuse reverberation signal to total signal relationship may be expressed by a fraction of a value reflecting the level of diffuse reverberation sound divided by a value reflecting the total emitted sound, or equivalently by a fraction of value reflecting the total emitted sound divided by a value reflecting the level of diffuse reverberation sound. It will also be appreciated that various modifications of the estimated values can be introduced, e.g. a non-linear function can be applied (e.g. a logarithmic function).

Such an approach may be consistent with current Standard proposals. In the preparations for the MPEG-I Audio Call for Proposals (CfP) an Encoder Input Format (EIF) has been defined (section 3.9 in MPEG output document N19211, "MPEG-I 6DoF Audio Encoder Input Format", MPEG 130). The EIF defines the reverberation level by a pre-delay and Direct-to-Diffuse Ratio (DDR). Despite the discrepancy with the name, it is defined as the ratio between emitted source energy and diffuse reverberation energy after pre-delay (DDR=DSR).

The diffuse reverberation energy may be considered to be the energy created by the room response from the start of the diffuse section, e.g. it may be the energy of the RIR from a time indicated by pre-delay until infinity. Note that subsequent excitations of the room will add up to reverb energy, so this can typically only be directly measured by excitation with a Dirac pulse. Alternatively, it can be derived from a measured RIR.

The reverberation energy represents the energy in a single point in the diffuse field space instead of integrated over the entire space.

A particularly advantageous alternative to the above would be to use a DSR that is indicative of an initial amplitude of diffuse sound relative to an energy of total emitted sound in the environment. Specifically, the DSR may indicate the reverberation amplitude at the time indicated by the pre-delay.

The amplitude at pre-delay may be the largest excitation of the room impulse response at or closely after pre-delay. E.g. within 5, 10, 20 or 50 ms after pre-delay. The reason for choosing the largest excitation in a certain range is that at the pre-delay time, the room impulse response may coincidentally be in a low part of the response. With the general trend being a decaying amplitude, the largest excitation in a short interval after the pre-delay is typically also the largest excitation of the entire diffuse reverberation response.

Using an DSR indicative of an initial amplitude (within an interval of e.g. 10 msec) makes it easier and more robust to map DSR to parameters in many reverberation algorithms. The DSR may thus in some embodiments be given as:

$$DSR = \frac{\text{diffuse reverb initial amplitude}}{\text{total emitted energy}}$$

In some embodiments, the reverberation energy parameter may represent an amplitude at a predetermined time for a room impulse response for the environment. As in the above example, the amplitude may be given as a relative amplitude (e.g. relative to the total emitted energy), and/or the predetermined time may be the start time the initialization of the diffuse reverberation portion of the RIR.

The parameters in the DSR are expressed with respect to the same source signal level reference.

This can, for example, be achieved by measuring (or simulating) the RIR of the room of interest with a microphone within certain known conditions (such as distance between source and microphone and the directivity pattern of the source). The source should emit a calibrated amount of energy into the room, e.g. a Dirac impulse with known energy.

A calibration factor for electrical conversions in the measurement equipment and analog to digital conversion can be measured or derived from specifications. It can also be calculated from the direct path response in the RIR which is predictable from the directivity pattern of the source and source-microphone distance. The direct response has a certain energy in the digital domain, and represents the emitted energy multiplied by the directivity gain for the direction of the microphone and a distance gain that may depend on the microphone surface relative to the total sphere surface area with radius equal to the source-microphone distance.

Both elements should use the same digital level reference. E.g. a full-scale 1 kHz sine corresponds to 100 dB SPL.

Measuring the diffuse reverberation energy from the RIR and compensating it with the calibration factor gives the appropriate energy in the same domain as the known emitted energy. Together with the emitted energy, the appropriate DSR can be calculated.

The reference distance may indicate the distance at which the distance gain to apply to the signal is 0 dB, i.e. where no gain or attenuation should be applied to compensate for the distance. The actual distance gain to apply by the path renderers 401 can then be calculated by considering the actual distance relative to the reference distance.

Representing the effect of distance to the sound propagation is performed with reference to a given distance. A doubling of the distance reduces the energy density (energy per surface unit) by 6 dB. A halving of the distance induces the energy density (energy per surface unit) by 6 dB.

In order to determine the distance gain at a given distance, distance corresponding to a given level must be known so the relative variation for the current distance can be determined, i.e. in order to determine how much the density has reduced or increased.

Ignoring absorption in air and assuming no reflections or occluding elements are present, the emitted energy of a source is constant on any sphere with any radius centered on the source position. The ratio of the surface corresponding to the actual distance vs the reference distance indicates the attenuation of the energy. The linear signal amplitude gain at rendering distance d can be represented b:

$$g_{dist} = \sqrt{\frac{A_{ref}}{A_{rend}}} = \sqrt{\frac{4\pi r_{ref}^2}{4\pi d^2}} = \frac{r_{ref}}{d}$$

where $r_{ref}$ is the reference distance.

As an example, this results in a signal attenuation of about 6 dB (or gain of −6 dB) if the reference distance is 1 meter and the rendering distance is 2 meters.

The total emitted energy indication may represent the total energy that a sound source emits. Typically, sound sources radiate out in all directions, but not equally in all directions. An integration of energy densities over a sphere around a source may provide the total emitted energy. In case of a loudspeaker, the emitted energy can often be calculated with knowledge of the voltage applied to the terminals and loudspeaker coefficients describing the impedance, energy losses and transfer of electric energy into sound pressure waves.

In some embodiments, the reverberation energy parameter may represent a distance for which an energy of a direct response for sound propagation in the environment is equal to an energy of reverberation in the environment. Such a parameter may for example be a critical distance parameter.

The critical distance may be considered/defined as the distance from a source to a (potentially nominal/virtual/theoretical) point (or audio receiver (e.g. a microphone)) at which the energy of the direct response is equal to that of the reverberant response. This distance may vary depending on the direction of the receiver with respect to the source in case of varying directivity.

The energy of the reverberant sound is more or less independent of the source and receiver positions in the room. The early reflections still have dependence on the positions, but the further one gets into the RIR, the less the level is dependent on the positions. Due to this property, there is a distance where the direct sound of the source is equally loud/has the same level as the reverberant sound of the same source.

Diffuse reverberation has homogenous level throughout the room, regardless the location of the audio source. A direct path response's level is very dependent on the distance between the location of the microphone/observer/listener and the source. The decay of the direct response level of an audio source as a function of its distance to a microphone is quite well defined. Therefore, the distance between an audio source and microphone is often used to denote critical distance. The distance at which the direct response of the audio source has decayed to the same level as the (constant) reverberation level. Critical distance is an acoustics property known by the person skilled in the art.

In the approach of FIG. 5, the apparatus may accordingly allow certain reverberation metadata parameters (delay and decay rate) to be modified with a compensator then adjusting associated reverberation energy metadata. The compensation may e.g. be such that the relation between the reverberation energy metadata and the other metadata parameters remains similar to the original in accordance with a suitable algorithm, criterion, and measure. The modified/compensated reverberation parameters are then fed to the renderer with the rendering of the reverberation signal component being based on the modified reverberation parameter values rather than on the original values.

In many embodiments, the renderer 400 may specifically be arranged to determine a level gain for the at least one reverberation signal component in dependence on the second parameter value. For example, the path/signal processing that is performed by the renderer to generate the reverberation signal components may include a gain/scale factor that sets the energy level for the reverberation signal components. For example, the renderer 400 may include an energy normalization function followed (or preceded) by a variable gain that is applied to the reverberation signal component (or to the input audio signal from which it is generated). The variable gain may set the overall level of the reverberation signal components. The renderer 400 may be arranged to determine the gain of the variable gain from the modified/compensated second parameter value.

In many embodiments, compensator 505 comprises a model for diffuse reverberation where the model is based on the reverberation parameters. The compensator 505 may be arranged to determine the new values based on this reverberation model, and specifically may modify parameters such that the evaluation of model for the modified parameters provide a desired result, which may typically be determined from the initial parameter values. For example, the compensated reverberation energy parameter value may be determined such that a parameter or measure that can be determined from the model for the original parameter values is unchanged (or changed in a desired way) for the combination of the modified reverberation decay rate parameter and/or reverberation delay parameter and the compensated reverberation energy parameter. Such a measure may for example be an energy/level ratio between energy of the direct path component of the RIR (or of an initial time interval, such as the time/delay until reverberation starts) and the energy of the reverberation portion. As another example, the measure may be an initial reference amplitude.

In bitstreams where reverberation metadata comprises a decay rate (e.g. $T_{60}$, $T_{30}$, $T_{20}$) and reverberation energy indication (e.g. DSR) the energy indication must explicitly or implicitly be related to a certain selection of the reverberation response/RIR. This typically concerns a start at a certain lag/delay in the RIR and continues sufficiently far into the RIR where the response amplitudes have decayed sufficiently close to a noise floor in the RIR (noise that may be caused by the resolution of the digital representation or by noise introduced by a measurement or measurement device). Due to the typically exponentially decaying nature of reverberation, the main defining point for the reverberation energy is typically the starting lag of the energy measurement, which corresponds with the pre-delay parameter described above.

The pre-delay value may be provided along with the other reverberation metadata but may also be implied by the definition of the reverberation energy indication used in the application.

A general mathematical equation can typically be used as a simple model for diffuse reverberation amplitude envelope. An exponential function typically matches the decaying amplitude envelope well:

$$AA = A_0 \cdot e^{-\alpha \cdot (t - t_{pre})}$$

for $t \geq t_{pre}$=predelay and with $$\alpha = \frac{\ln\left(10^{-\frac{60}{20}}\right)}{T60},$$

(the decay factor controlled by $T_{60}$), and $A_0$ the amplitude at pre-delay ($t_{pre}$). Thus, in such a case, the reverberation delay parameter may be given by a pre-delay, the reverberation decay rate parameter given by a T60 value, and with the reverberation energy parameter given by the amplitude at pre-delay (t3).

Figure 7:
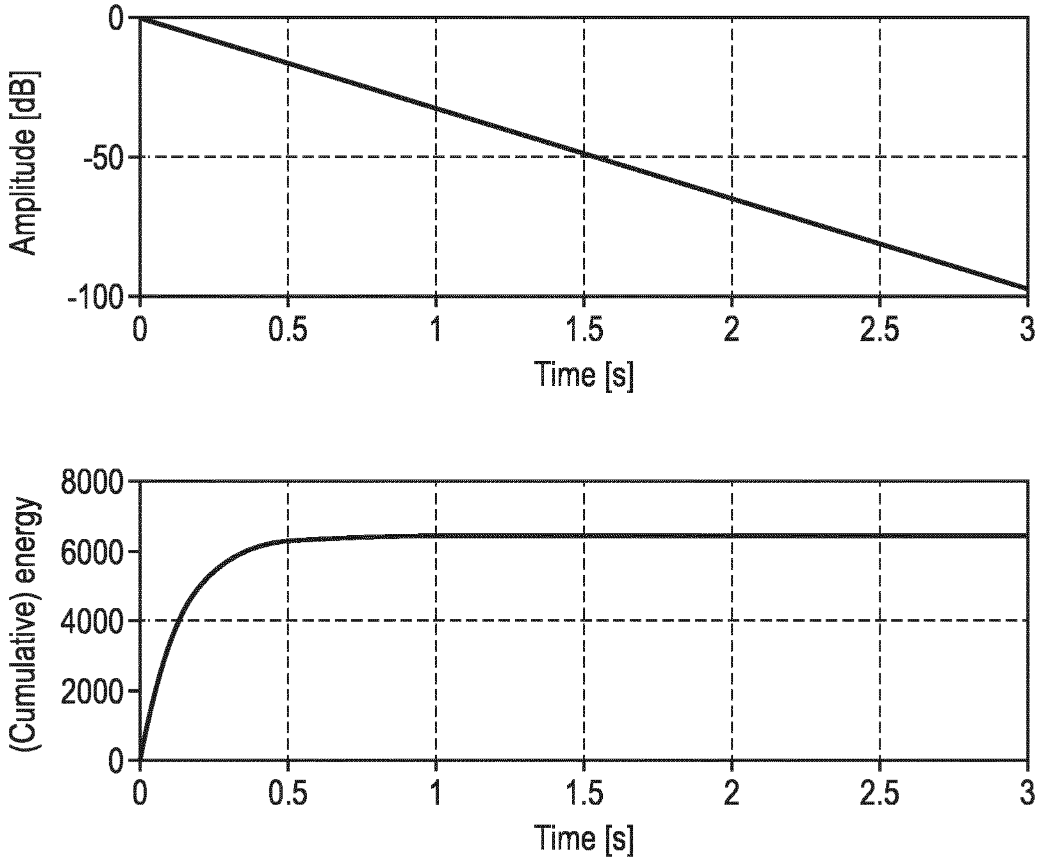
FIG. 7 illustrates an example of a amplitude and accumulated energy for a room impulse response.

Calculating the cumulative energy of a function like this, it will asymptotically approach some final energy value as indicated in FIG. 7.

Typically, the diffuse reverberation is quite sparse as a function of time (a lot of values are lower than the amplitude indication given by the exponential function) and in order to determine the energy of the reverberation from the above equation, a compensation is typically included, often simply as a scale factor.

Indeed, starting from the mathematical model, the energy calculated with the model is typically proportional to the reverberation energy. It is therefore often not a suitable model for predicting reverberation energy without (empirically derived) corrections. However, the proportionality can be used without any corrections to calculate energy adjustment factors for modifications of pre-delay or $T_{60}$. The reverberation energy can be calculated by the model with an integration from pre-delay to infinity (because no noise floor is included in the model), and can be solved analytically (using $$t = \frac{n}{f_s}$$

):

$$G_{corr} \cdot E_{pre} = \int_{n=n_{pre}}^{\infty} A_0^2 \cdot e^{-2\alpha \cdot \frac{n-n_{pre}}{f_s}} = \left[-\frac{A_0^2 \cdot f_s}{2\alpha} \cdot e^{-2\alpha \cdot \frac{(n-n_{pre})}{f_s}}\right]_{n_{pre}}^{\infty} = \frac{A_0^2 \cdot f_s}{2\alpha}$$

where $G_{corr}$ represents the correction factor to map the model energy to the reverberation energy, $A_0$ represents the initial reverberation amplitude at $t=t_{pre}$ (the predelay) and $E_{pre}$ the reverberation energy from pre-delay onwards.

The model may e.g. be used to determine the ratio between the model's energy prediction for before and after modification and the reverberation energy parameter may then be adapted to reflect this change, e.g. it may simply be compensated by the same ratio.

In some embodiments, the modifier 503 may specifically be arranged to modify a reverberation delay parameter that is indicative of a propagation time delay for reverberation in the environment/RIR. Specifically, the modifier 503 may be arranged to modify the pre-delay. The pre-delay is typically used to indicate the start of the diffuse reverberation part of the RIR. Thus, the pre-delay may indicate the time (delay) from which the RIR is dominated by diffuse reverberation and thus the part which is typically rendered by a diffuse reverberation renderer, such as a Jot-reverberator. The pre-delay is accordingly typically used by the renderer to indicate which part of the RIR is rendered by the diffuse reverberation rendering functionality rather than by path renderers. In the example, of FIG. 4, the pre-delay is used to indicate the time instant of the RIR which is rendered by the reverberator 407 and path renderers 401 respectively.

Figure 8:
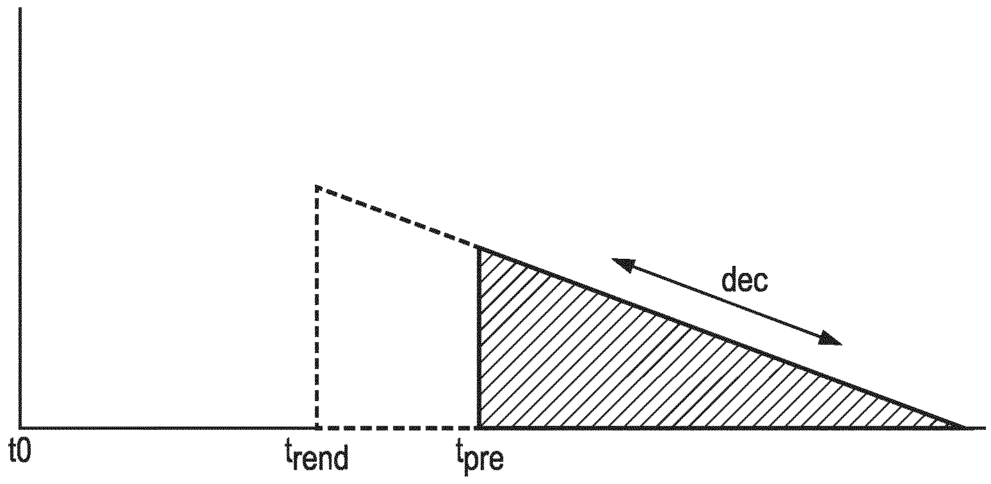
FIG. 8 illustrates an example of a reverberation part of a room impulse response.
Figure 9:
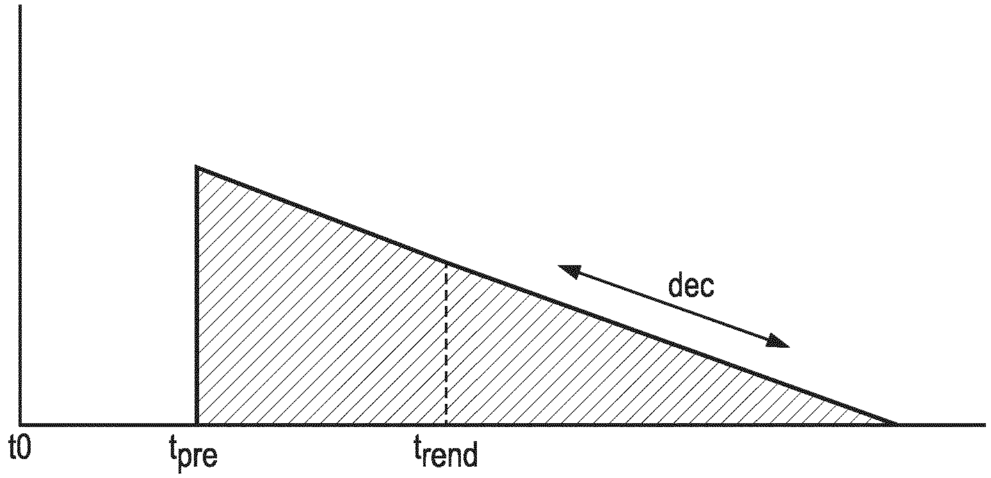
FIG. 9 illustrates an example of a reverberation part of a room impulse response.

In some embodiments, the modifier 403 may be arranged to modify the pre-delay (whether a default value or one indicated by the received meta-data) prior to the rendering. This may modify how much of the RIR is modelled by the diffuse reverberation renderer 407 and how much is rendered by the path renderers 401. As illustrated in FIGS. 8 and 9 which shows the diffuse reverberation portion of a RIR, the pre-delay prior to modification $t_{pre}$ may be modified to a new value $t_{rend}$ which may be earlier (FIG. 8) or later (FIG. 9) than the original value $t_{pre}$.

Such a modification may in some embodiments be performed e.g. manually to achieve a desired perceptual effect. For example, path renderers may tend to provide a more accurate rendering and the user may e.g. adjust quality of the rendered audio by modifying the pre-delay.

However, in some embodiments, the modification may be automatic. For example, the path rendering tends to be significantly more computationally resource demanding than diffuse reverberation rendering using a parametric reverberator. In some embodiments, the modifier may be arranged to determine a computational loading of the device and/or to determine an amount of available computational resource for the rendering (many approaches for determining such measures will be known to the skilled person). The modifier may be arranged to modify the reverberation delay parameter/pre-delay in response to the available computational resource. In particular, it may increase the delay for an increasing amount of available resource and decrease the delay for a decreasing amount of available resource. E.g. the delay (modification) may be a monotonically decreasing function of the available computational resource.

The pre-delay parameter may also be changed for other reasons than renderer configuration, for example transcoding of the metadata to a different format that requires alignment with an implicit pre-delay value or a co-signaled HRTF with a certain filter length.

A renderer that includes diffuse reverberation rendering, may thus render the diffuse reverberation from a different lag than the pre-delay of the metadata indicates (or the default/nominal pre-delay). As a result, the required reverberation energy would be different than indicated by the received metadata, leading to a reverberation effect/experience that is different from what was intended by the metadata. In many cases, this difference may be significant.

In the described approach, the compensator 505 may adjust the reverberation energy parameter of the metadata to represent perceptually similar reverberation energy metadata for which the adjusted pre-delay corresponds to the rendering delay (or otherwise target delay). The adjustment may be such that the reverberation energy with updated pre-delay represents a similar reverberation effect/experience as the original reverberation energy metadata. E.g., in FIGS. 8 and 9 the grey area indicates the reverberation energy that should be provided by the diffuse reverberator.

This is different from that of the RIR from the pre-delay $t_{pre}$ until infinity. In FIG. 8 the energy metadata value(s) are too low for reverberation rendering to start at an earlier lag (dashed triangle). In FIG. 9 the energy metadata value(s) are too high for rendering to start at a later lag (dashed triangle).

In many embodiments, the modifier 505 may be arranged to modify the reverberation energy parameter such that the energy/amplitude/level of the reverberation during the part of the RIR which after the modification of the reverberation delay parameter is considered to be the reverberation part, and which specifically is going to be rendered by the reverberation renderer, will be the similar or even the same when determined using the initial delay and energy indicated by the parameters and when using the modified delay and energy.

Specifically, in many embodiments, the compensator 505 may be arranged to determine the modified reverberation energy parameter value such that it reduces the difference between a first reverberation energy measure and a second reverberation energy measure. Both energy measures are determined for reverberation starting at the modified delay value and both energy measures are determined using the same model, such as specifically the exponential decrease reverberation model previously introduced. However, the first measure is determined by evaluating the model using the modified parameter values for the reverberation delay parameter and for the reverberation energy parameter whereas the second measure is determined by evaluating the model using the initial (prior to modification/compensation) parameter values for the reverberation delay parameter and for the reverberation energy parameter. The compensator 505 may specifically set the modified reverberation energy parameter value such that these energies are equal, and thus such that the energy for reverberation after the modified delay will be consistent with the original values.

Thus, the first reverberation energy measure may be determined as an energy of reverberation after a modified delay represented by the modified reverberation delay parameter. It may be determined from a reverberation model using the modified delay value and the modified reverberation energy parameter. The first reverberation energy measure may be indicative of the energy of reverberation after the modified delay as calculated using the modified values.

The second reverberation energy measure may also be determined as an energy of reverberation after a modified delay represented by the modified reverberation delay parameter. It may also be determined from the same reverberation model but by using the initial delay value and the initial reverberation energy parameter. The second reverberation energy measure may be indicative of the energy of reverberation after the modified delay as calculated using the initial values.

In many embodiments, the compensator 505 may be arranged to modify the reverberation energy parameter such that it reduces (or even removes) the difference in a reverberation amplitude as a function of time for the reverberation after the modified delay (specifically the render delay which indicates the part of the RIR that is rendered by the reverberation renderer).

The reverberation renderer is as previously described typically arranged to generate the reverberation signal component to include only contributions corresponding to propagation delays that exceed a propagation delay time indicated by the modified delay. The reverberation renderer may specifically implement the part of the RIR which follows the modified delay time.

As a specific example using the previously provided exponential model, it may be considered that if the energy of the reverberation from the initial unmodified pre-delay and onwards is proportional to the model energy ($G_{corr}$), then the energy of the reverberation from the modified pre-delay will be proportional in the same way (i.e. the compensation required to indicate sparseness may be the same).

$$G_{corr}\cdot E_{render} = \int_{n=n_{render}}^{\infty} A_0^2\cdot e^{-2\alpha\cdot\frac{n-n_{pre}}{fs}}$$

$$= \left[-\frac{A_0^2\cdot fs}{2\alpha}\cdot e^{-2\alpha\cdot\frac{(n-n_{pre})}{fs}}\right]_{n_{render}}^{\infty} \quad G_{corr}\cdot E_{render}$$

$$= \frac{A_0^2\cdot fs}{2\alpha}\cdot e^{-2\alpha\cdot\frac{(n_{render}-n_{pre})}{fs}}$$

with $$\alpha = \frac{ln\left(10^{-\frac{60}{20}}\right)}{T60}$$

and $E_{render}$ being the energy measure calculated based on the model (and the index pre generally being used to indicate initial values prior to modification, and the index render being used to indicate modified values).

An energy conversion factor can be calculated with these equations that scales the reverberation energy metadata from a value that corresponds to the initial pre-delay to a value that corresponds to the modified pre-delay (also referred to as the render delay), and still describe the same reverberation characteristics:

$$G_{conv} = \frac{E_{render}}{E_{pre}}$$

$$= \frac{A_0^2\cdot fs}{2\alpha}\cdot e^{-2\alpha\cdot\frac{(n_{render}-n_{pre})}{fs}} \Big/ \frac{A_0^2\cdot fs}{2\alpha}$$

$$= e^{-2\alpha\cdot\frac{(n_{render}-n_{pre})}{fs}}$$

From the equation, it can be seen that the conversion factor is smaller than 1 when $n_{render}>n_{pre}$, and larger than 1 when $n_{pre}>n_{render}$.

For example, DSR parameters may be compensated with it before using $DSR_{render}$ for calculating the configuration of the reverberation rendering:

$$DSR_{render}=DSR_{metadata}*G_{conv}$$

In some embodiments, the modifier may be arranged to modify a reverberation decay rate, such as a $T_{60}$ value. This may for example in many embodiments be desired in order to modify a perceptual experience of the environment by modifying the perceived amount of reverberation. It may for example be manually modified by a user to provide a modified perception, and e.g. specifically a different artistic effect.

However, modifying a decay rate may also affect the reverberation energy. A shorter $T_{60}$ results in less reverberation energy because of it corresponds to a faster decay.

Figure 10:
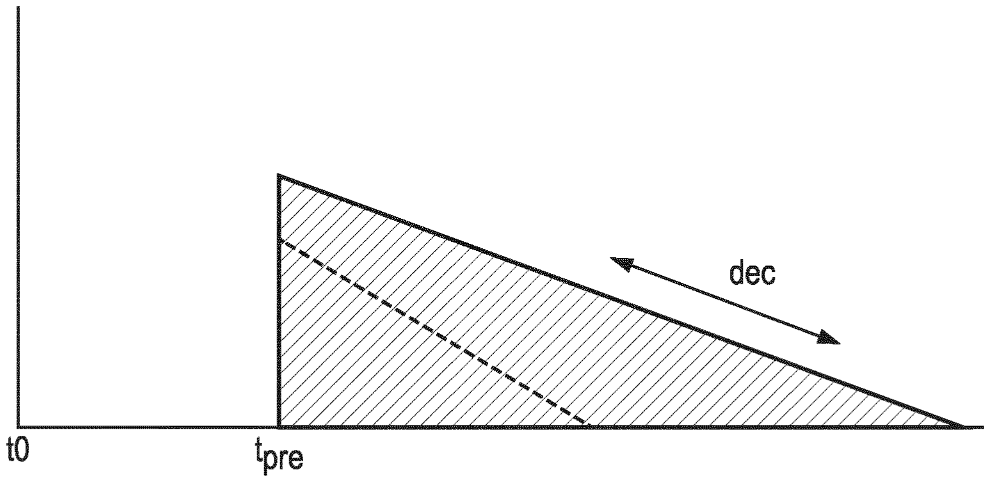
FIG. 10 illustrates an example of a reverberation part of a room impulse response.
Figure 11:
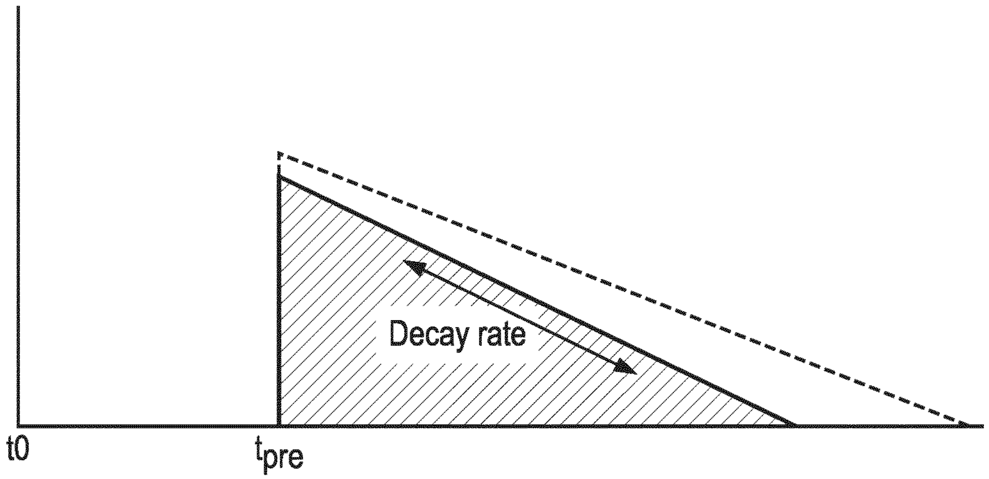
FIG. 11 illustrates an example of a reverberation part of a room impulse response.

Moreover, the changed decay rate may not only affect the decay rate of the reverberation response after pre-delay, but typically also affects the decay prior to the pre-delay, and therefore the initial reverberation response amplitude at the pre-delay lag associated with the reverberation energy indication. This may be illustrated by FIGS. 10, 11 and 12 which illustrate situations where the reverberation energy parameter prior to modification/compensation indicates an energy (indicated by the grey triangle) which is a mismatch to the desired conditions for rendering, i.e. for the modified decay parameter. In FIG. 10 the unmodified reverberation energy parameter will have a value(s) that is too high for rendering the reverberation with a shorter decay time (dashed triangle). In FIG. 11 the unmodified reverberation energy parameter will have a value(s) that is too low for rendering the reverberation with a longer decay time (dashed triangle).

In the system of FIG. 5, the compensator may compensate the reverberation energy parameter to indicate a modified energy level that may correspond to the modified reverberation decay rate parameter value. It may reduce the indicated energy value for an increased decay rate and/or may increase it for a decreased decay rate.

In many embodiments, the compensator 505 may be arranged to modify the reverberation energy parameter value to reduce a change in the amplitude reference ($A_{00}$ in FIG. 12) for the reverberation decay rate resulting from the modification of the first reverberation parameter, and specifically it may seek to maintain this reference amplitude to be substantially unchanged.

The amplitude reference is a function of the reverberation decay rate and the reverberation energy parameter, and may for example be considered a value at t=0 of the RIR which results in a decay rate and energy level of the diffuse reverberation portion of the RIR (i.e. the RIR after the pre-delay) as indicated by the decay rate and reverberation energy indications.

This may typically result in the reverberation energy parameter being modified to correspond to the modified decay rate, similarly to how the original reverberation energy metadata corresponds to the original decay rate.

Figure 12:
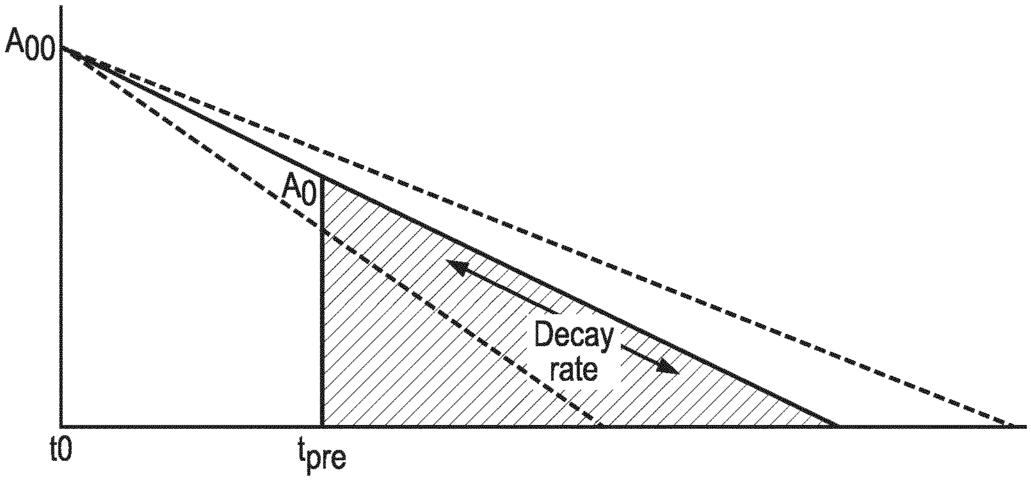
FIG. 12 illustrates an example of a reverberation part of a room impulse response.

As a specific example, the modifier 503 may change a $T_{60}$ value to modify the room characteristics, and in response the modify a reverberation energy parameter in the form of a DSR. Based on e.g. the previously presented model for reverberation, it may be determined how the DSR should be adjusted. Typically, when $T_{60}$ changes, the amplitude at the pre-delay time/start of the diffuse reverberation, $A_0$, also changes, as can be seen in FIG. 12. As a consequence, it can be considered that there is a double effect on the DSR, one directly from the changed decay during reverberation, and one for the effect of the changed decay on the RIR until the pre-delay and thus on the amplitude $A_0$ at the start of the reverberation portion.

The change in $A_0$ can be determined by the effect of the changed decay rate prior to the pre-delay. Typically, the early part of a RIR is very dependent on source and receiver position used in the measurement or modelling of the RIR. This gives rise to, for example, early decay, which causes a steeper decay in the early part of the RIR when source and receiver are relatively close.

In terms of adjusting reverberation parameters for diffuse reverberation modelling, it is often beneficial to ignore these aspects and assume a RIR that has a consistent decay rate over its entire length. This matches well with source and receiver being relatively far apart.

To this end, the approach may be based on the reference amplitude for the decay line to be at $t=t_0$, as illustrated in FIG. 12.

$$A_{00} = A_0 * 10^{\left(\frac{t_{pre} - t_0}{T60} * \frac{60}{20}\right)}$$

where typically $t_0=0$.

Next, the modified $A_0$ value for the modified reverberation delay parameter, $A_r$, can be calculated with the modified $T_{60}$ referenced $T60_r$.

$$A_r = A_{00} * 10^{-\left(\frac{t_{pre} - t_0}{T60_r} * \frac{60}{20}\right)}$$

or, put together $$A_r = A_0 * 10^{\left(\left(\frac{T60_r - T60}{T60 * T60_r}\right) * \frac{60}{20} * (t_{pre} - t_0)\right)}$$

The conversion factor for reverberation energy then becomes:

$$G_{conv} = \frac{E_{render}}{E_{pre}} = \frac{A_r^2}{\alpha_r}\frac{\alpha}{A_0^2}$$

with $$\alpha_r = \frac{ln\left(10^{-\frac{60}{20}}\right)}{T60_r}.$$

Further simplifying to:

$$G_{conv} = \frac{T60_r}{T60} * 10^{\left(2 * \left(\frac{T60_r - T60}{T60 * T60_r}\right) * \frac{60}{20} * (t_{pre} - t_0)\right)}$$

The conversion gain is applied by multiplication, similarly to the situation for the modification of a reverberation delay parameter.

The conversion gain is frequency dependent when $T_{60}$ is frequency dependent.

In the above examples, the compensation of the reverberation energy parameter was simply achieved by determining a linear conversion or compensation factor and applying this to the reverberation energy parameter in the form of a DSF parameter.

Similar approaches may be used for reverberation energy parameter e.g. being a critical distance or an amplitude parameter.

For example, if the reverberation energy parameter is a critical distance parameter, this also implies a certain pre-delay from which the reverberant response energy is calculated. Thus, the same conversion may be applied. For example:

$$E_{pre} = E_{cd}$$

$$E_{rend} = E_{pre} * G_{conv} = E_{cd} * G_{conv}$$

with $E_{cd}$ being the energy of the direct response at critical distance, $E_{pre}$ the reverberation energy measured from the pre-delay associated with the critical distance metadata and $E_{rend}$ representing the reverberation energy from the rendering delay.

In an example where the reverberation energy parameter is expressed in terms of amplitude, such as the initial reverb energy amplitude to source energy (or total energy or source amplitude) ratio, the square-root of the gain is taken, as is well known by a person skilled in the art.

$$DSR_{render}=DSR_{metadata}*\sqrt{G_{conv}}$$

If both a reverberation delay parameter and reverberation decay rate parameter are changed the compensations may be combined. For example, the conversion gains indicated for the different parameters above may be combined, e.g. simply by multiplying them.

In the following specific aspects of various embodiments of the approach of FIGS. 4 and 5 will be described in more detail.

Figure 13:
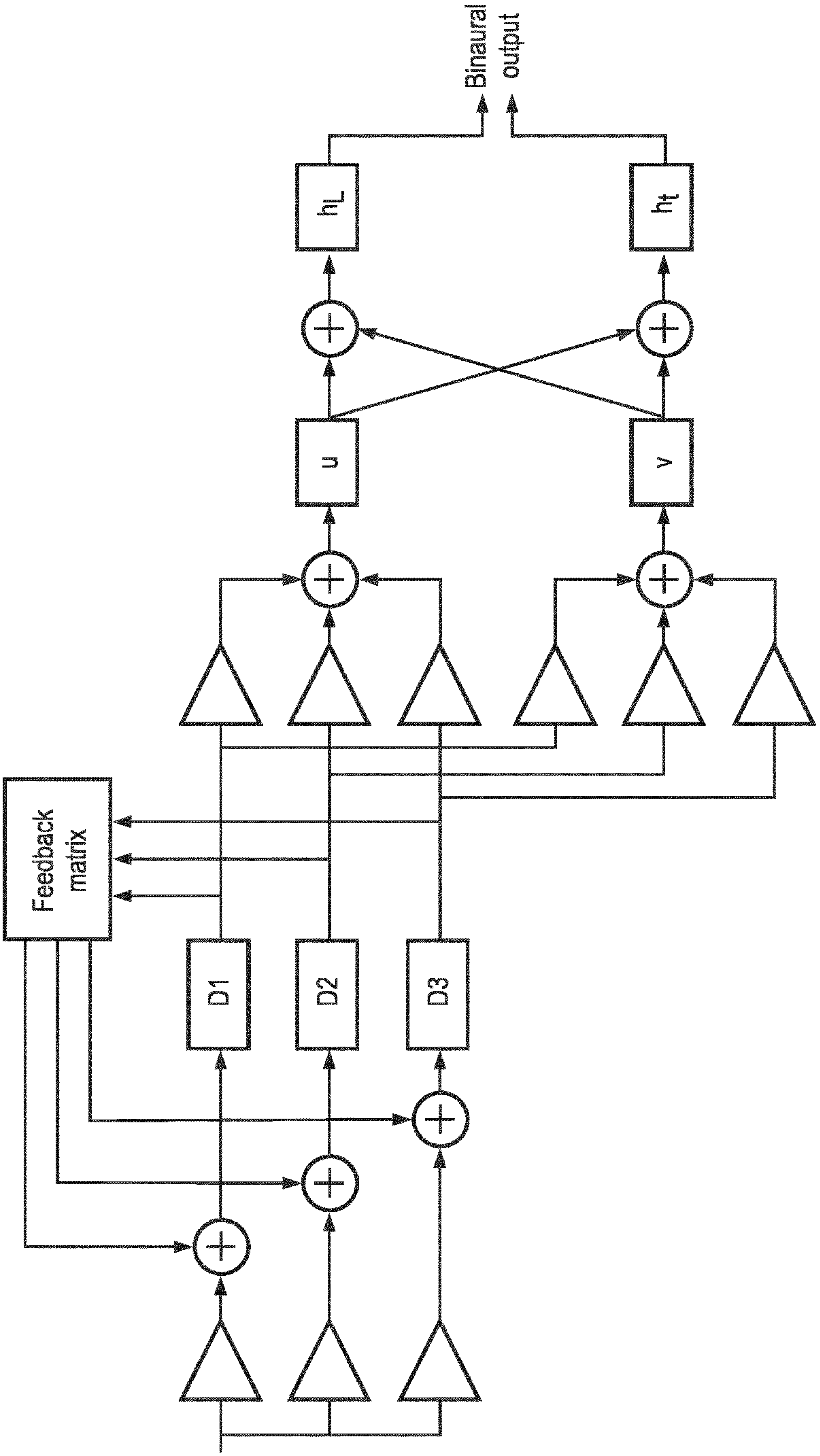
FIG. 13 illustrates an example of a parametric reverberator.

The renderer 407 may specifically generate the reverberation by generating a downmix of the individual audio sources and then applying this signal to a parametric reverberator, such as the Jot reverberator of FIG. 13, where the parametric reverberator is set up based on the reverberation parameters.

Figure 14:
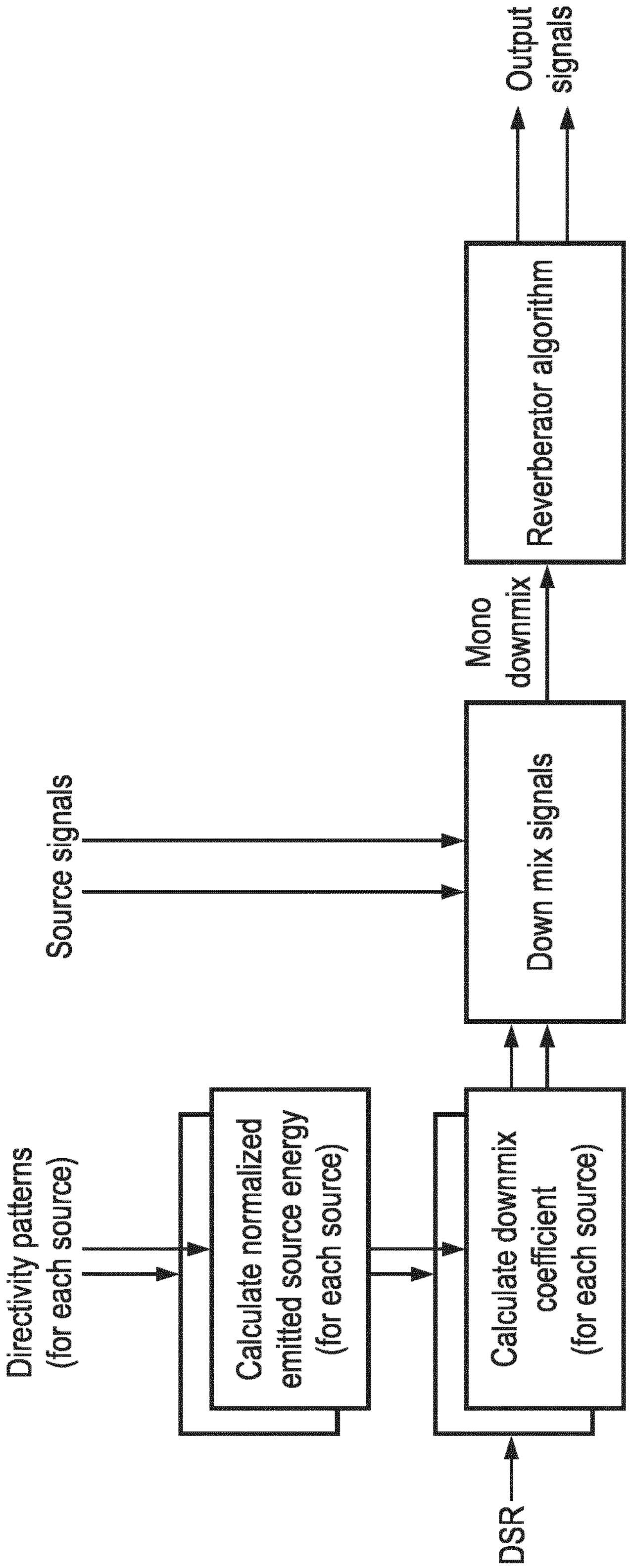
FIG. 14 illustrates an example of a reverberator.

The approach may be based on applying reverberation processes to a downmix signal as previously described and as illustrated in FIG. 14. Downmix coefficients may be determined and correspond to a weighting for that audio signal in the downmix. The downmix coefficient may be a weight for the audio signal in a weighted combination generating the downmix signal. Thus, the downmix coefficients may be relative weights for the audio signals when combining these to generate the downmix signal (which in many embodiments is a mono signal), e.g. they may be the weights of a weighted summation.

The downmix coefficients may be based on the received diffuse reverberation signal to total signal ratio, i.e. the Diffuse to Source Ratio, DSR.

The coefficients are further determined in response to a determined total emitted energy indication which is indicative of the total energy emitted from the audio source. Whereas the DSR is typically common for some, and typically all of the audio signals, the total emitted energy indication is typically specific to each audio source.

The total emitted energy indication is typically indicative of a normalized total emitted energy, and may be independent of signal content, wholly defined by source properties such as directivity pattern and reference distance. The same normalization may be applied to all the audio sources and to the direct and reflect path components. Thus, the total emitted energy indication may be a relative value with respect to the total emitted energy indications for other audio sources/signals or with respect to the individual path components or with respect to a full-scale sample value of an audio signal.

The total emitted energy indication when combined with the DSR may for each audio source provide a downmix coefficient which reflects the relative contribution to the diffuse reverberation sound from that audio source. Thus, determining the downmix coefficient as a function of the DSR and the total emitted energy indication can provide downmix coefficients that reflect the relative contribution to the diffuse sound. Using the downmix coefficients to generate a downmix signal can thus result in a downmix signal which reflects the total generated sound in the environment with each of the sound sources weighted appropriately and with the acoustic environment being accurately modelled.

In many embodiments, the downmix coefficient as a function of the DSR and the total emitted energy indication combined with a scaling in response to reverberator properties may provide downmix coefficients that reflect the appropriate relative level of the diffuse reverberation sound with respect to the corresponding path signal components.

The total emitted energy may be determined from the metadata received for the audio sources.

The received metadata may include a signal reference level for each source which provides an indication of a level of the audio. The signal reference level is typically a normalized or relative value which provides an indication of the signal reference level relative to other audio sources or relative to a normalized reference level. Thus, the signal reference level may typically not indicate the absolute sound level for a source but rather a relative level relative to other audio sources.

In the specific example, the signal reference level may include an indication in the form of a reference distance which provides a distance for which a distance attenuation to be applied to the audio signal is 0 dB. Thus, for a distance between the audio source and the listener equal to the reference distance, the received audio signal can be used without any distance dependent scaling. For a distance less than the reference distance, the attenuation is less and thus a gain higher than 0 dB should be applied when determining the sound level at the listening position. For a distance higher than the reference distance, the attenuation is higher and thus an attenuation higher than 0 dB should be applied when determining the sound level at the listening position. Equivalently, for a given distance between the audio source and the listening position, a higher gain will be applied to an audio signal associated with a higher reference distance than one associated with a shorter reference distance. As the audio signal is typically normalized to represent meaningful reference distance or to exploit the full dynamic range (e.g. a jet engine and a cricket will both be represented by audio signals exploiting the full dynamic range of the data words used), the reference distance provides an indication of the signal reference level for the specific audio source.

In the example, the signal reference level is further indicated by a reference gain referred to as a pre-gain. The reference gain is provided for each audio source and provides a gain that should be applied to the audio signal when determining the rendered audio levels. Thus, the pre-gain may be used to further indicate level variations between the different audio sources.

The metadata may further includes directivity data which is indicative of directivity of sound radiation from the sound source represented by the audio signal. The directivity data for each audio source may be indicative of a relative gain, relative to the signal reference level, in different directions from the audio source. The directivity data may for example provide a full function or description of a radiation pattern from the audio source defining the gain in each direction. As another example, a simplified indication may be used such as e.g. a single data value indicating a predetermined pattern. As yet another example, the directivity data may provide individual gain values for a range of different direction intervals (e.g. segments of a sphere).

The metadata together with the audio signals may thus allow audio levels to be generated. Specifically, the path renderers may determine the signal component for the direct path by applying a gain to the audio signal where the gain is a combination of the pre-gain, a distance gain determined as a function of the distance between the audio source and the listener and the reference distance, and the directivity gain in the direction from the audio source to the listener.

With respect to the generation of the diffuse reverberation signal, the metadata is used to determine a (normalized) total emitted energy indication for an audio source based on the signal reference level and the directivity data for the audio source.

Specifically, the total emitted energy indication may be generated by integrating the directivity gain over all directions (e.g. integrating over a surface of a sphere centered at the position of the audio source) and scaled by the signal reference level, and specifically by the distance gain and the pre-gain.

The determined total emitted energy indication is then processed with the DSR to generate the downmix coefficients.

The downmix coefficients are then used to generate the downmix signal. Specifically, the downmix signal may be generated as a combination, and specifically summation, of the audio signals with each audio signal being weighted by the downmix coefficient for the corresponding audio signal.

The downmix is typically generated as a mono-signal which is then fed to the reverberator which proceeds to generate the diffuse reverberation signal.

It should be noted that whereas the rendering and generation of the individual path signal components by the path renderers 401 is position dependent e.g. with respect to determining the distance gain and the directivity gain, then the generation of the diffuse reverberation signal can be independent of the position of both the source and of the listener.

The total emitted energy indication can be determined based on the signal reference level and the directivity data without considering the positions of the source and listener. Specifically, pre-gain and the reference distance for a source can be used to determine a non-directivity dependent signal reference level at a nominal distance from the source (the nominal distance being the same for all audio signals/sources) and which is normalized with respect to e.g. a full-scale sample of the audio signals. The integration of the directivity gains over all directions can be performed for a normalized sphere, such as e.g. for a sphere at the reference distance. Thus, the total emitted energy indication will be independent of the source and listener position (reflecting that diffuse reverberation sound tends to be homogenous in an environment such as a room). The total emitted energy indication is then combined with the DSR to generate the downmix coefficients (in many embodiments other parameters such as parameters of the reverberator may also be considered). As the DSR is also independent of the positions, as is the downmix and reverberation processing, the diffuse reverberation signal may be generated without any consideration of the specific positions of the source and listener.

Such an approach may provide a high performance and naturally sounding audio perception without requiring excessive computational resource. It may be particularly suitable for e.g. virtual reality applications where a user (and sources) may move around in the environment and thus where the relative positions of the listener (and possibly some or all of the audio sources) may change dynamically.

The reverberator may determine the total emitted energy indication by considering the directivity data for the audio source. It should be noted that it is important to use the total emitted energy rather than just the signal level or the signal reference level when determining diffuse reverberation signals for sources that may have varying source directivity. E.g., consider a source directivity corresponding to a very narrow beam with directivity coefficient 1, and with a coefficient of 0 for all other directions (i.e. energy is only transmitted in the very narrow beam). In this case, the emitted source energy may be very similar to the energy of the audio signal and signal reference level as this is representative of the total energy. If another source with an audio signal with the same energy and signal reference level, but with an omnidirectional directivity is instead considered, the emitted energy of this source will be much higher than the audio signal energy and signal reference levels. Therefore, with both sources active at the same time, the signal of the omnidirectional source should be represented much stronger in the diffuse reverberation signal, and thus in the downmix, than the very directional source.

The emitted energy may be determined from integrating the energy density over the surface of a sphere surrounding the audio source. Ignoring the distance gain, i.e. integrating over a surface for a radius where the distance gain is 0 dB (i.e. with a radius corresponding to the reference distance), a total emitted energy indication can be determined from:

$$E = \iint_S (g \cdot p \cdot x)^2 \, dS$$

where, g is the directivity gain function, p is the pre-gain associated with the audio signal/source and x indicates the level of the audio signal itself.

Since p is independent of direction, it can also be moved outside the integral. Similarly, the signal x is independent of the direction (the directivity gain reflects that variation). (It can be multiplied later, since:

$$g_1^2 * x^2 + g_2^2 * x^2 + g_3^2 * x^2 + \cdots = (g_1^2 + g_2^2 + g_3^2 + \cdots) * x^2$$

and thus the integral becomes independent of the signal.)

One specific approach for determining this integral is described in more detail in the following.

It is desired to integrate the directivity gains over a sphere.

$$E_{scale} = \iint_S g^2 \, dS$$

Using a sphere with radius equal to the reference distance (r) means that the distance gain is 0 dB and thus the distance gain/attenuation can be ignored.

A sphere is chosen in this example because it provides an advantageous calculation, but the same energy can be determined from any closed surface of any shape enclosing the source position. As long as the appropriate distance gain and directivity gain is used in the integral, and the effective surface is considered that is facing the source position (i.e. with a normal vector in line with the source position).

A surface integral should define a small surface dS. Therefore, defining a sphere with two parameters, azimuth (a) and elevation (e) provides the dimensions to do this. Using the coordinate system for our solution we get:

$$f(a, e, r) = r * \cos(e) * \cos(a) * u_x + r * \cos(e) * \cos(a) * u_y + r * \sin(e) * u_z$$

where $u_x$, $u_y$ and $u_z$ are unit base vectors of the coordinate system.

The small surface dS is the magnitude of the cross-product of partial derivatives of the sphere surface with respect to the two parameters, times the differentials of each parameter:

$$dS = |f_a \times f_e|\, da\ de$$

The derivatives determine the vectors tangential to the sphere at the point of interest.

$$f_a = -r*\cos(e)*\sin(a)*u_x + r*\cos(e)*\cos(a)*u_y + 0*u_z$$

$$f_e = -r*\sin(e)*\cos(a)*u_x - r*\sin(e)*\sin(a)*u_y + r*\cos(e)*u_z$$

Cross-product of the derivatives is a vector perpendicular to both.

$$\begin{aligned} f_a \times f_e &= \left(r^2*\cos(e)*\cos(a)*\cos(e) + 0*\sin(e)*\sin(a)\right)*u_x + (-0* \\ &\quad \sin(e)*\cos(a) + r^2*\cos(e)*\sin(a)*\cos(e))*u_y + \left(r^2*\cos(e)* \right.\\ &\quad \left.\sin(a)*\sin(e)*\sin(a) + r^2*\cos(e)*\cos(a)*\sin(e)*\cos(a)\right)*u_z \\ &= r^2*\cos^2(e)*\cos(a)*u_x + r^2*\cos^2(e)*\sin(a)*u_y + \left(r^2* \right.\\ &\quad \left.\cos(e)*\sin(e)*\sin^2(a) + r^2*\cos(e)*\sin(e)*\cos^2(a)\right)*u_z \\ &= r^2*\cos^2(e)*\cos(a)*u_x + r^2*\cos^2(e)*\sin(a)* \\ &\quad u_y + \left(r^2*\cos(e)*\sin(e)*\left(\sin^2(a)+\cos^2(a)\right)\right)*u_z \\ &= r^2*\cos^2(e)*\cos(a)*u_x + r^2*\cos^2(e)*\sin(a)*u_y + \\ &\quad r^2*\cos(e)*\sin(e)*u_z \end{aligned}$$

Magnitude of the cross-product is the surface area of the parallelogram spanned by vectors f_a and f_e, and thus the surface area on the sphere:

$$\begin{aligned} |f_a \times f_e| &= sqrt\left(\left(r^2*\cos^2(e)*\cos(a)\right)^2 + \right.\\ &\quad \left.\left(r^2*\cos^2(e)*\sin(a)\right)^2 + \left(r^2*\cos(e)*\sin(e)\right)^2\right) \\ &= sqrt\left(r^4*\cos^4(e)*\cos^2(a) + r^4*\cos^4(e)*\sin^2(a) + \right.\\ &\quad \left. r^4*\cos^2(e)*\sin^2(e)\right) \\ &= sqrt\left(r^4*\cos^4(e)*\left(\cos^2(a)+\sin^2(a)\right) + r^4*\cos^2(e)*\sin^2(e)\right) \\ &= sqrt\left(r^4*\cos^4(e) + r^4*\cos^2(e)*\sin^2(e)\right) \\ &= sqrt\left(r^4*\cos^2(e)*\left(\cos^2(e)+\sin^2(e)\right)\right) \\ &= sqrt\left(r^4*\cos^2(e)\right) \\ &= \text{abs}\left(r^2*\cos(e)\right) = r^2*\cos(e) \text{ when } e = [-0.5*pi,\ 0.5*pi] \end{aligned}$$

Resulting in:

$$dS = r^2*\cos(e)*da*de$$

where the first two terms define a normalized surface area, and with the multiplication by da and de it becomes an actual surface, based on the size of the segments da and de. The double integral over the surface can then be expressed in terms of azimuth and elevation. The surface dS is, as per the above, expressed in terms of a and e. The two integrals can be performed over azimuth=0 . . . 2*pi (inner integral), and elevation =–0.5*pi . . . 0.5*pi (outer integral).

$$E_{scale} = \int_{-0.5\pi}^{0.5\pi} \int_{0}^{2\pi} g^2(a, e) \cdot r^2 \cdot \cos(e) \cdot da \cdot de$$

where g(a, e) is the directivity as a function of azimuth and elevation. Hence if g(a, e)=1, the result should be the surface of the sphere. (Working out the integral analytically as a proof results in 4*pi*$r^2$ as expected).

In many practical embodiments, the directivity pattern may not be provided as an integrable function, but e.g. as a discrete set of sample points. For example, each sampled directivity gain is associated with an azimuth and elevation. Typically, these samples will represent a grid on a sphere. One approach to handle this is to turn the integrals into summations, i.e. a discrete integration may be performed. The integration may in this example be implemented as a summation over points on the sphere for which a directivity gain is available. This gives the values for g(a, e), but requires that da and de are chosen correctly, such that they do not result in large errors due to overlap or gaps.

In other embodiments, the directivity pattern may be provided as a limited number of non-uniformly spaced points in space. In this case, the directivity pattern may be interpolated and uniformly resampled over the range of azimuths and elevations of interest.

An alternative solution may be to assume g(a, e) to be constant around its defined point and solve the integral locally analytically. E.g. for a small azimuth and elevation range. E.g. midway between the neighboring defined points. This uses the above integral, but with different ranges of a and e, and g(a, e) assumed constant.

Experiments show that with the straightforward summation, errors are small, even with rather coarse resolution of the directivity. Further, the errors are independent of the radius. For linear spacing of azimuth between 10 points, and 10 linearly spaced points of elevation results in a relative error of –20 dB.

The integral as expressed above, provides a result that scales with the radius of the sphere. Hence, it scales with the reference distance. This dependency on the radius is because we do not take into account the inverse effect of 'distance gain' between the two different radii. If the radius doubles, the energy 'flowing' through a fixed surface area (e.g. 1 cm2) is 6 dB lower. Therefore, one could say that the integration should take into account distance gain. However, the integration is done at reference distance, which is defined as the distance at which the distance gain is reflected in the signal. In other words, the signal level indicated by the reference distance is not included as a scaling of the value being integrated but is reflected by the surface area over which the integration being performed varying with the reference distance (since the integration is performed over a sphere with radius equal to the reference distance).

As a result, the integral as described above reflects an audio signal energy scaling factor (including any pre-gain or similar calibration adjustment), because the audio signal represents the correct signal playback energy at a fixed surface area on the sphere with radius equal to the reference distance (without directivity gain).

That means that if the reference distance is larger, without changing the signal, the total signal energy scaling factor is also larger. This is because the corresponding signal represents a sound source that is relatively louder than one with the same signal energy, but at a smaller reference distance.

In other words, by performing the integration over the surface of a sphere with a radius equal to the reference distance, the signal level indication provided by the reference distance is automatically taken into account. A higher reference distance will result in a larger surface area and thus a larger total emitted energy indication. The integration is specifically performed directly at distance for which the distance gain is 1.

The integral above results in values that are normalized to the used surface unit and to the unit used for indicating the reference distance r. If the reference distance r is expressed in meters, then the result of the integral is provided in the unit of $m^2$.

To relate the estimated emitted energy value to the signal, it should be expressed in a surface unit that corresponds to the signal. Since the signal's level represents the level at which it should be played for a user at reference distance, the surface area of a human ear may be better suited. At the reference distance this surface relative to the whole sphere's surface would be related to the portion of the source's energy that one would perceive.

Therefore, a total emitted energy indication representing the emitted source energy normalized for full-scale samples in the audio signal can be indicated by:

$$E_{norm} = \frac{E_{dir,r} * p^2}{S_{ear}}$$

where $E_{dir,r}$ indicates the energy determined by integrating the directivity gain over the surface of a sphere with radius equal to the reference distance, p is the pre-gain, and $S_{ear}$ is a normalization scaling factor (to relate the determined energy to the area of a human ear).

With the DSR characterizing the diffuse acoustic properties of a space and the calculated emitted source energy derived from directivity, pre-gain and reference distance metadata, the corresponding reverberation energy can be calculated.

The DSR may typically be determined with the same reference levels used by both its components. This may or may not be the same as the total emitted energy indication. Regardless, when such an DSR is combined with the total emitted energy indication the resulting reverberation energy is also expressed as an energy that is normalized for full-scale samples in the audio signal, when the total emitted energy determined by the above integration is used. In other words, all the energies considered are essentially normalized to the same reference levels such that they can directly be combined without requiring level adjustments. Specifically, the determined total emitted energy can directly be used with the DSR to generate a level indication for the diffuse reverberation generated from each source where the level indication directly indicates the appropriate level with respect to the diffuse reverberation for other audio sources and with respect to the individual path signal components.

As a specific example, the relative signal levels for the diffuse reverberation signal components for the different sources may directly be obtained by multiplying the DSR by the total emitted energy indication.

In the described system, the adaptation of the contributions of different audio sources to the diffuse reverberation signal is at least partially performed by adapting downmix coefficients used to generate the downmix signal. Thus, the downmix coefficients may be generated such that the relative contributions/energy levels of the diffuse sound from each audio source reflect the determined diffuse reverberation energy for the sources.

As a specific example, if the DSR indicates an initial amplitude level, the downmix coefficients may be determined to be proportional to (or equal to) the DSR multiplied by the total emitted energy indication. If the DSR indicates an energy level, the downmix coefficients may be determined to be proportional to (or equal to) the square root of the DSR multiplied by the total emitted energy indication.

As a specific example, a downmix coefficient $d_x$ for providing an appropriate adjustment for signal with index x of the plurality of input signals may be calculated by:

$$d_x = p \cdot \sqrt{E_{norm,x} * DSR}$$

where p denotes pre-gain and $$E_{norm,x} = \frac{E_{scale}}{S_{ear}}$$

the normalized emitted source energy for signal x, prior to pre-gain. DSR represents the ratio of diffuse reverberation energy to emitted source energy. When the downmix coefficient $d_x$ is applied to the input signal x, the resulting signal is representing a signal level that, when filtered by a reverberator that has a reverberation response of unit energy, provides the correct diffuse reverberation energy for signal x with respect to the direct path rendering of signal x and with respect to direct paths and diffuse reverberation energies of other sources j≠x.

Alternatively, a downmix coefficient $d_x$ may be calculated according to:

$$d_x = E_{norm,x} * \text{DSR}$$

where $$E_{norm,x} = \frac{E_{dir,r} * p^2}{S_{ear}}$$

denotes the normalized emotted source energy for signal x and DSR represents the ratio of diffuse reverberation energy to initial reverberation response amplitude. When the downmix coefficient $d_x$ is applied to the input signal x, the resulting signal is representing a signal level that corresponds to the initial level of the diffuse reverberation signal, and can be processed by a reverberator that has a reverberation response that starts with amplitude 1. As a result, the output of the reverberator provides the correct diffuse reverberation energy for signal x with respect to the direct path rendering of signal x and with respect to direct paths and diffuse reverberation energies of other sources j≠x.

In many embodiments, the downmix coefficients are partially determined by combining the DSR with the total emitted energy indication. Whether the DSR indicates the relation of the total emitted energy to the diffuse reverberation energy or an initial amplitude for the diffuse reverberation response, a further adaptation of the downmix coefficients is often necessary to adapt for the specific reverberator algorithm used that scales the signals such that the output of the reverberation processor is reflecting the desired energy or initial amplitude. For example, the density of the reflections in a reverberation algorithm have a strong influence on the produced reverberation energy while the input level stays the same. As another example, the initial amplitude of the reverberation algorithm may not be equal to the amplitude of its excitation. Therefore, an algorithm-specific, or algorithm- and configuration-specific, adjustment may be needed. This can be included in the downmix coefficients and is typically common to all sources. For some embodiments these adjustments may be applied to the downmix or included in the reverberator algorithm.

Once the downmix coefficients are generated, the downmix signal may be generated the e.g. by a direct weighted combination or summation.

An advantage of the described approach is that it may use a conventional reverberator. For example, the reverberator 407 may be implemented by a feedback delay network, such as e.g. implemented in a standard Jot reverberator.

As illustrated in FIG. 13, the principle of feedback delay networks uses one or more (typically more than one) feedback loops with different delays. An input signal, in the present case the downmix signal, is fed to loops where the signals are fed back with appropriate feedback gains. Output signals are extracted by combining signals in the loops. Signals are therefore continuously repeated with different delays. Using delays that are mutually prime and having a feedback matrix that mixes signals between loops can create a pattern that is similar to reverberation in real spaces.

The absolute value of the elements in the feedback matrix must be smaller than 1 to achieve a stable, decaying impulse response. In many implementations, additional gains or filters are included in the loops. These filters can control the attenuation instead of the matrix. Using filters has the benefit that the decaying response can be different for different frequencies.

In some embodiments where the output of the reverberator is binaurally rendered, the estimated reverberation may be filtered by the average HRTFs (Head Related Transfer Functions) for the left and right cars respectively in order to produce the left and right channel reverberation signals. When HRTFs are available for more than one distance at uniformly spaced intervals on a sphere around the user, one may appreciate that the average HRTFs for the left and right cars are generated using the set of HRTFs with the largest distance. Using average HRTFs may be based/reflect a consideration that the reverberation is isotropic and coming from all directions. Therefore, rather than including a pair of HRTFs for a given direction, an average over all HRTFs can be used. The averaging may be performed once for the left and once for the right car, and the resulting filters may be used to process the output of the reverberator for binaural rendering.

The reverberator may in some cases itself introduce coloration of the input signals, leading to an output that does not have the desired output diffuse signal energy as described by the DSR. Therefore, the effects of this process may be equalized as well. This equalization can be performed based on filters that are analytically determined as the inverse of the frequency response of the reverberator operation. In some embodiments, the transfer function can be estimated using machine estimation learning techniques such as linear regression, line-fitting, etc.

In some embodiments, the same approach may be applied uniformly to the entire frequency band. However, in other embodiments, a frequency dependent processing may be performed. For example, one or more of the provided metadata parameters may be frequency dependent. In such an example, the apparatus may be arranged to divide the signals into different frequency bands corresponding to the frequency dependency and processing as described previously may be performed individually in each of the frequency bands.

Specifically, in some embodiments, the diffuse reverberation signal to total signal ratio, DSR, is frequency dependent. For example, different DSR values may be provided for a range of discrete frequency bands/bins or the DSR may be provided as a function of frequency. In such an embodiment, the apparatus may be arranged to generate frequency dependent downmix coefficients reflecting the frequency dependency of the DSR. For example, downmix coefficients for individual frequency bands may be generated. Similarly, a frequency dependent downmix and diffuse reverberation signal may be consequently be generated.

For a frequency dependent DSR, the downmix coefficients may in other embodiments be complemented by filters that filter the audio signal as part of the generation of the downmix. As another example, the DSR effect may be separated into a frequency independent (broadband) component used to generate frequency independent downmix coefficients used to scale the individual audio signals when generating the downmix signal and a frequency dependent component that may be applied to the downmix, e.g. by applying a frequency dependent filter to the downmix. In some embodiments, such a filter may be combined with further coloration filters, e.g. as part of the reverberator algorithm. FIG. 7 illustrates an example with correlation (u, v) and coloration ($h_L$, $h_R$) filters. This is a Feedback Delay Network specifically for binaural output, known as a Jot reverberator.

Thus, in some embodiments, the DSR may comprise a frequency dependent component part and a non-frequency dependent component part and the downmix coefficients may be determined in dependence on the non-frequency dependent component part (and independently of the frequency dependent part). The processing of the downmix may then be adapted based on the frequency dependent component part, i.e. the reverberator may be adapted in dependence on the frequency dependent part.

In some embodiments, the directivity of sound radiation from one or more of the audio sources may be frequency dependent and in such a scenario a frequency dependent total emitted energy may be generated which when combined with the DSR (which may be frequency dependent or independent) may result in frequency dependent downmix coefficients.

This may for example be achieved by performing individual processing in discrete frequency bands. In contrast to the processing for a frequency dependent DSR, the frequency dependency for the directivity must typically be performed prior to (or as part of) the generation of the downmix signal. This reflects that a frequency dependent downmix is typically required for including frequency dependent effects of directivity as these are typically different for different sources. After integration, it is possible that the net effect has significant variation over frequency, i.e. the total emitted energy indication for a given source may have substantial frequency dependency with this being different for different sources. Thus, as different sources typically have different directivity patterns, the total emitted energy indication for different sources also typically have different frequency dependencies.

A specific example of a possible approach will be described in the following. Providing an DSR characterizing the diffuse acoustic properties of a space and determining an emitted source energy from directivity, pre-gain and reference distance metadata, allows the corresponding desired reverberation energy to be calculated. For example, this can be determined as:

$$E_{norm}*DSR$$

When the components for calculating the DSR are using the same reference level (e.g. related to the full scale of the signal), the resulting reverberation energy will also be an energy normalized for full-scale samples in the PCM signal, when using $E_{norm}$ as calculated above for the emitted source energy, and therefore corresponds to the energy of an Impulse Response (IR) for the diffuse reverberation that could be applied to the corresponding input signal to provide the correct level of reverberation in the used signal representation.

These energy values can be used to determine configuration parameters of a reverberation algorithm, a downmix coefficient or downmix filter prior to the reverberation algorithm.

There are different ways to generate reverberation. Feedback Delay Network, (FDN)-based algorithms such as the Jot reverberator are suitable low complexity approaches. Alternatively, a noise sequence can be shaped to have appropriate (frequency-dependent) decay and spectral shape. In both examples, a prototypical IR (with at least appropriate T60) can be adjusted such that its (frequency-dependent) level is corrected.

The reverberator algorithms may be adjusted such that they produce impulse responses with unit energy (or the unit initial amplitude of DSR may be in relation to an initial amplitude) or the reverberator algorithm may include its own compensation, e.g. in the coloration filters of a Jot reverberator. Alternatively, the downmix may be modified with a (potentially frequency dependent) adjustment, or the downmix coefficients produced by the coefficient processor 507 may be modified.

The compensation may be determined by generating an impulse response without any such adjustment, but with all other configurations applied (such as appropriate reverberation time (T60) and reflection density (e.g. delay values in FDN) and measuring the energy of that IR.

$$E_{protRev} = \sum_{n=0}^{N_{max}} h_{rev}(n)$$

The compensation may be the inverse of that energy. For inclusion in the downmix coefficients a square-root is typically applied. E.g.:

$$d_x = \sqrt{\frac{E_{norm,x} * DSR}{E_{protRev}}}$$

In many other embodiments, the compensation may be derived from the configuration parameters. For example, when DSR is relative to an initial reverberation amplitude, the first reflection can be derived from its configuration. The correlation filters are energy preserving by definition, and also the coloration filters can be designed to be.

Assuming no net boost or attenuation by the coloration filters, the reverberator may for example result in an initial amplitude ($A_0$) that depends on T60 and the smallest delay value minDelay:

$$A0 = 10^{\frac{-3*minDelay}{T60*fs}} * \sqrt{T60}$$

Predicting the reverberation energy may also be done heuristically.

As a general model for diffuse reverberation energy, an exponential function A(t) can be considered:

$$\alpha = \frac{\ln\left(10^{-\frac{60}{20}}\right)}{-T60}$$

$$A(t) = A_0 \cdot e^{-\alpha\cdot(t-t3)}$$

for t≥t3=predelay. With a the decay factor controlled by T60, and $A_0$ the amplitude at pre-delay.

Calculating the cumulative energy of a function like this, it will asymptotically approach some final energy value. The final energy value has an almost perfectly linear relation with T60.

The factor of the linear relation depends on the sparseness of function A (setting every 2nd value to 0 results about half the energy), the initial value $A_0$ (energy scales linearly with $$A_0^2)$$

and the sample rate (scales linearly with changes in fs). The diffuse tail can be modelled reliably with such a function, using T60, reflection density (derived from FDN delays) and sample rate. $A_0$ for the model can be calculated as shown above, to be equal to that of the FDN.

When generating multiple parametric reverbs with broadband T60 values in the range 0.1-2 s, the energy of the IR is close to linear with the model. The scale factor between the actual energy and the exponential equation model averages is determined by the sparseness of the FDN response. This sparseness becomes less towards the end of the IR but has most impact in the beginning. It has been found, from testing the above with multiple configurations of the delay values that a nearly linear relation exists between the model reduction factor and the smallest different between the delays configured in the FDN.

For example, for a certain implementation of a Jot reverberator, this may amount to a scale factor SF calculated by:

$$SF = 7.0208 * \text{Min}DelayDiff + 214.1928$$

The energy of model is calculated by integrating from t=0 to infinity. This can be done analytically and results in:

$$revModelEnergy = \frac{A_0^2 * fs}{2 * \text{alpha}}$$

Combining the above, we get the following prediction for the reverb energy.

$$revPredEnergy = \frac{A_0^2 * fs}{2 * \text{alpha}} \cdot \frac{1}{0.8776 * \text{Min}DelayDiff + 26.7741}$$

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An apparatus comprising a receiver circuit, wherein the receiver circuit is arranged to receive audio data and metadata for the audio data, wherein the audio data comprises data for a plurality of audio signals, wherein plurality of audio signals represent audio sources in an environment, wherein the metadata comprises reverberation parameters for the environment;

a modifier circuit, wherein the modifier circuit is arranged to generate a modified first parameter value by modifying a first parameter value of a first reverberation parameter, wherein the first reverberation parameter is a parameter from the group consisting of a reverberation delay parameter and a reverberation decay rate parameter;

a compensator circuit, wherein the compensator circuit is arranged to generate a modified second parameter value by modifying an initial second parameter value for a second reverberation parameter in response to the modification of the first reverberation parameter, wherein the second reverberation parameter is included in the metadata, wherein the second reverberation parameter is indicative of an energy of reverberation in the acoustic environment;

a renderer circuit, wherein the renderer circuit is arranged to generate audio output signals by rendering the audio data using the metadata, wherein the renderer circuit comprises a reverberation renderer circuit, wherein the reverberation renderer circuit is arranged to generate at least one reverberation signal component for at least one audio output signal from at least one of the plurality of audio signals, in response to the first modified parameter value and the second modified parameter value.

2. The apparatus of claim 1, wherein the compensator circuit comprises a model for diffuse reverberation, wherein the model is dependent on the first reverberation parameter and the second reverberation parameter, wherein the compensator circuit is arranged to determine the modified second parameter value in response to the model.

3. The apparatus of claim 1, wherein the first reverberation parameter is a reverberation decay rate.

4. The apparatus of claim 3, wherein the compensator circuit is arranged to modify the second parameter value so as to reduce a change in an amplitude reference for the reverberation decay rate, wherein the change in the amplitude reference for the reverberation decay rate results from the modification of the first reverberation parameter.

5. The apparatus of claim 4, wherein the compensator circuit is arranged to modify the second parameter value such that the amplitude reference for the reverberation decay rate is substantially unchanged.

6. The apparatus of claim 1, wherein the first reverberation parameter is a reverberation delay parameter, wherein the reverberation delay parameter indicates a propagation time delay for reverberation in the environment.

7. The apparatus of claim 1, wherein the second reverberation parameter is indicative of an energy of reverberation in the acoustic environment after a propagation time delay, wherein the propagation time delay is indicated by the first reverberation parameter.

8. The apparatus of claim 6, wherein the compensator circuit is arranged to determine the modified second parameter value so as to reduce a difference between a first reverberation energy and a second reverberation energy, wherein the first reverberation energy is an energy of reverberation after a modified delay, wherein the modified delay is represented by the modified first parameter value, wherein the modified delay is determined from a reverberation model using the modified delay value and the modified second parameter value, wherein the second reverberation energy is an energy of reverberation after the modified delay, wherein the second reverberation energy is determined from the reverberation model using the initial delay value and the initial second parameter value.

9. The apparatus of claim 8, wherein the compensator circuit is arranged to determine the modified second reverberation parameter value such that the first reverberation energy and the second reverberation energy are substantially the same.

10. The apparatus of claim 6, wherein the compensator circuit is arranged to modify the second parameter value so as to reduce a difference in a reverberation amplitude as a function of time when a delay exceeds a delay indicated by the modified first parameter value.

11. The apparatus of claim 1, wherein the second parameter represents a level of diffuse reverberation sound relative to total emitted sound in the environment.

12. The apparatus of claim 1, wherein the second reverberation parameter represents a distance for which an energy of a direct response for sound propagation in the environment is equal to an energy of reverberation in the environment.

13. The apparatus of claim 1, wherein the first reverberation parameter is one of the reverberation parameters of the metadata.

14. A method of operation for an audio apparatus comprising:

receiving audio data and metadata for the audio data, wherein the audio data comprises data for a plurality of audio signals, wherein plurality of audio signals represent audio sources in an environment, wherein the metadata comprises reverberation parameters for the environment;

modifying a first parameter value by modifying a first parameter value of a first reverberation parameter, wherein the first reverberation parameter is a parameter from the group consisting of a reverberation delay parameter and a reverberation decay rate parameter;

generating a modified second parameter value by modifying an initial second parameter value for a second reverberation parameter in response to the modification of the first reverberation parameter, wherein the second reverberation parameter is included in the metadata, wherein the second reverberation parameter is indicative of an energy of reverberation in the acoustic environment;

generating audio output signals by rendering the audio data using the metadata, generating at least one reverberation signal component for at least one audio output signal from at least one of the plurality of audio signals in response to the first modified parameter value and the second modified parameter value.

15. A computer program stored on a non-transitory medium, wherein the computer program when executed on a processor performs the method as claimed in claim 14.

16. The method of claim 14, further comprising determining the modified second parameter value in response to a model, wherein the model is for diffuse reverberation, wherein the model is dependent on the first reverberation parameter and the second reverberation parameter.

17. The method of claim 14, wherein the first reverberation parameter is a reverberation decay rate.

18. The method of claim 17, further comprising modifying the second parameter value so as to reduce a change in an amplitude reference for the reverberation decay rate, wherein the change in the amplitude reference for the reverberation decay rate results from the modification of the first reverberation parameter.

19. The method of claim 18, further comprising modifying the second parameter value such that the amplitude reference for the reverberation decay rate is substantially unchanged.

20. The method of claim 14, wherein the first reverberation parameter is a reverberation delay parameter, wherein the reverberation delay parameter indicates a propagation time delay for reverberation in the environment.

21. The method of claim 14, wherein the second reverberation parameter is indicative of an energy of reverberation in the acoustic environment after a propagation time delay, wherein the propagation time delay is indicated by the first reverberation parameter.

22. The method of claim 20, further comprising modifying determine the modified second parameter value so as to reduce a difference between a first reverberation energy and a second reverberation energy, wherein the first reverberation energy is an energy of reverberation after a modified delay, wherein the modified delay is represented by the modified first parameter value, wherein the modified delay is determined from a reverberation model using the modified delay value and the modified second parameter value, wherein the second reverberation energy is an energy of reverberation after the modified delay, wherein the second reverberation energy is determined from the reverberation model using the initial delay value and the initial second parameter value.

23. The method of claim 22, further comprising determining the modified second reverberation parameter value such that the first reverberation energy and the second reverberation energy are substantially the same.

24. The method of claim 20, further comprising modifying the second parameter value so as to reduce a difference in a reverberation amplitude as a function of time when a delay exceeds a delay indicated by the modified first parameter value.

25. The method of claim 14, wherein the second parameter represents a level of diffuse reverberation sound relative to total emitted sound in the environment.

26. The method of claim 14, wherein the second reverberation parameter represents a distance for which an energy of a direct response for sound propagation in the environment is equal to an energy of reverberation in the environment.

27. The method of claim 14, wherein the first reverberation parameter is one of the reverberation parameters of the metadata.

* * * * *